US012534103B2

(12) United States Patent
Gyllenhammar et al.

(10) Patent No.: US 12,534,103 B2
(45) Date of Patent: Jan. 27, 2026

(54) METHODS AND SYSTEMS FOR AUTOMATED DRIVING SYSTEM EXPERIENCE MONITORING AND/OR MANAGEMENT

(71) Applicant: Zenuity AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: Zenuity AB, Gothenburg (SE)

( * ) Notice: Subject to any disclaimer, the term of this patent is extended or adjusted under 35 U.S.C. 154(b) by 613 days.

(21) Appl. No.: 17/530,616

(22) Filed: Nov. 19, 2021

(65) Prior Publication Data
US 2022/0161816 A1 May 26, 2022

(30) Foreign Application Priority Data
Nov. 26, 2020 (EP) .................................. 20210095

(51) Int. Cl.
B60W 60/00 (2020.01)
G06F 18/214 (2023.01)
(Continued)

(52) U.S. Cl.
CPC ......... B60W 60/001 (2020.02); G06F 18/214 (2023.01); G06N 20/00 (2019.01); G08G 1/20 (2013.01); B60W 2555/20 (2020.02)

(58) Field of Classification Search
CPC ............. B60W 60/001; B60W 2555/20; G06F 18/214; G06F 18/2414; G06N 20/00;
(Continued)

(56) References Cited

U.S. PATENT DOCUMENTS

2019/0220011 A1* 7/2019 Della Penna ........ G07C 5/0841
2020/0033869 A1 1/2020 Palanisamy et al.
(Continued)

FOREIGN PATENT DOCUMENTS

EP 3492872 A1 6/2019

OTHER PUBLICATIONS

Extended European Search Report mailed May 26, 2021 for European Patent Application No. 20210095.4, 10 pages.
(Continued)

Primary Examiner — Anne Marie Antonucci
Assistant Examiner — Jodi Jones
(74) Attorney, Agent, or Firm — Sage Patent Group

(57) ABSTRACT

Various methods for managing and/or monitoring new experiences of an Automated Driving System, ADS, of a vehicle are disclosed. In one example, an ADS experience library is used as training data for an autoencoder on-board the vehicle. A data stream representing driving experiences encountered by the vehicle as it is being driven around is suitably segmented and passed through the autoencoder. The output of the autoencoder exaggerates the reconstruction error for any data in a data segment not included in the training data set. This enables anomalous behavioural data indicative of a new experience encountered by a vehicle when it is being driven around to be identified in the data stream passed through the autoencoder, making it possible to send just the anomalous behavioural data to a back-end fleet server configured to monitor and manage a fleet of vehicles in a timely and bandwidth efficient manner.

7 Claims, 8 Drawing Sheets

(51) Int. Cl.
*G06N 20/00* (2019.01)
*G08G 1/00* (2006.01)
(58) Field of Classification Search
CPC ........ G06N 3/045; G06N 3/044; G06N 3/047;
G06N 3/088; G08G 1/20; G06Q 50/40;
G06V 20/56; G05B 23/0221
USPC ... 701/23, 1, 117, 36, 31.1, 30.7, 30.6, 30.5,
701/481, 40, 30.9, 10, 106, 44, 524, 98,
701/65, 27
See application file for complete search history.

(56) References Cited

U.S. PATENT DOCUMENTS

2020/0357285 A1    11/2020  Kim
2020/0364579 A1*   11/2020  Misu ................. G06N 3/084
2021/0256846 A1*    8/2021  McErlean ........... G08G 1/091
2022/0289252 A1*    9/2022  Liu ................. G08G 1/096783

OTHER PUBLICATIONS

Liu et al., "Visualization of driving behavior using Deep Sparse Autoencoder", 2014 IEEE Intelligent Vehicles Symposium Proceedings, Jun. 8-11, 2014, 9 pages.
Sama et al., "Driving Feature Extraction and Behavior Classification Using an Autoencoder to Reproduce the Velocity Styles of Experts", 2018 21st International Conference on Intelligent Transportation Systems (ITSC), Nov. 4-7, 2-18, 2018, 8 pages.
Xie et al., "Driving Maneuver Classification: A Comparison Study of Feature Extraction Methods", IEEE Sensors Journal, vol. 18, Issue 12, Jun. 15, 2018, 9 pages.
Gyllenhammar et al., "Defining Fundamental Vehicle Actions for the Development of Automated Driving Systems," SAE Technical Paper, Jan. 7, 2020, 10 pages.
Ulbrich et al., "Defining and Substantiating the Terms Scene, Situation, and Scenario for Automated Driving," 2015 IEEE 18th International Conference on Intelligent Transportation Systems, Sep. 15-18, 2015, 8 pages.
Weber et al., "A framework for definition of logical scenarios for safety assurance of automated driving", Traffic Injury Prevention vol. 20, No. S1, Jun. 9, 2019, 7 pages.
Elrofai et al., "StreetWise: Scenario-based Safety Validation of Connected Automated Driving", TNO Innovation for Life Repository of the University of Delft, Jul. 2018, 28 pages.
Denouden et al., "Improving Reconstruction Autoencoder Out-of-distribution Detection with Mahalanobis Distance", arXiv: 1812.02765v1, University of Waterloo, Dec. 6, 2018, 9 pages.
Communication pursuant to Article 94(3) EPC mailed Jul. 25, 2025 for European Patent Application No. 20210095.4, 9 pages.
Bolte, Jan Aike et al.; "Towards Corner Case Detection for Autonomous Driving"; 2019 IEEE Intelligent Vehicles Symposium (IV); Paris, France; Jun. 9-12, 2019; pp. 438-445 (8 pages).

* cited by examiner

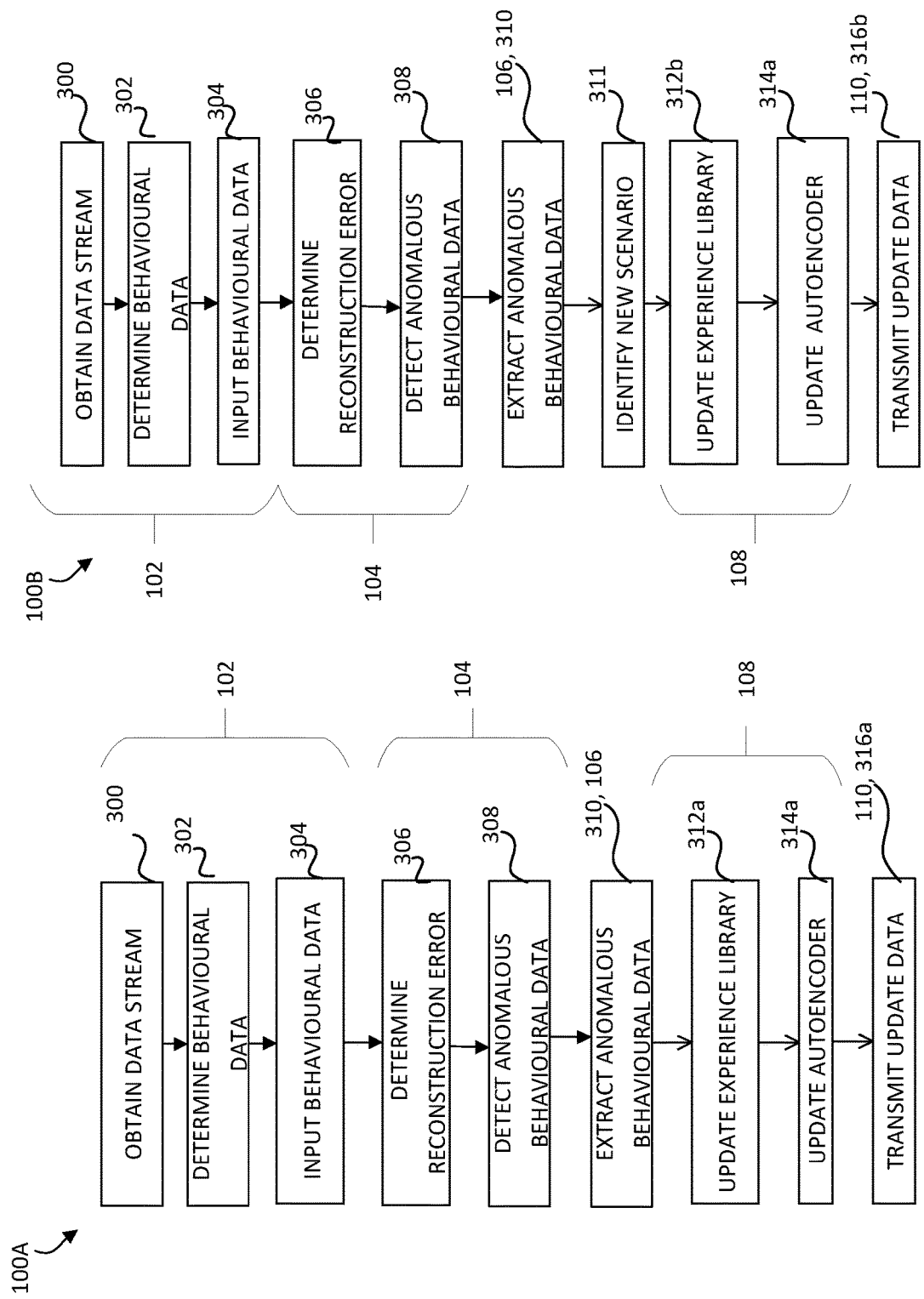

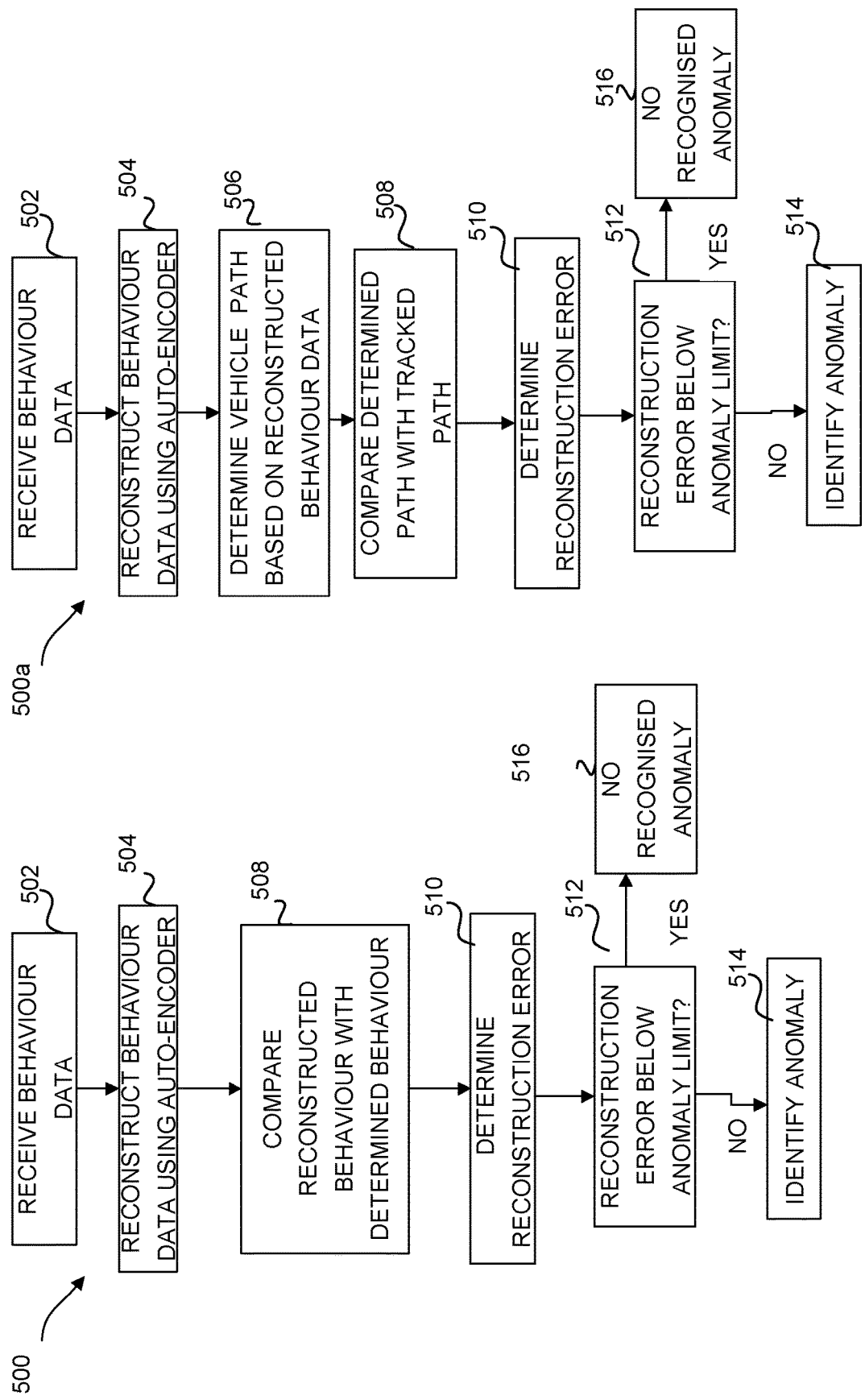

METHODS AND SYSTEMS FOR AUTOMATED DRIVING SYSTEM EXPERIENCE MONITORING AND/OR MANAGEMENT

CROSS-REFERENCE TO RELATED APPLICATIONS

The present application for patent claims priority to European Patent Office Application Ser. No. 20210095.4, entitled "METHODS AND SYSTEMS FOR AUTOMATED DRIVING SYSTEM EXPERIENCE MONITORING AND/OR MANAGEMENT" filed on Nov. 26, 2020, assigned to the assignee hereof, and expressly incorporated herein by reference.

TECHNICAL FIELD OF THE INVENTION

The present disclosure relates to methods, systems and related aspects for driving experience monitoring and/or management for an Automated or Autonomous Driving System, ADS, of a vehicle in which a new or rare ADS driving experience is identified as anomalous sensed behaviour using a machine learning model, such as an autoencoder, which is implemented on-board each vehicle. The machine learning model is configured to distinguish between any new or rare experiences and experiences which are already known (as in they were used for development and/or previous analysis) by the ADS system of that vehicle encountered by the vehicle whilst it is being driven around.

In particular, but not exclusively, the present disclosure relates to methods and systems for monitoring new experiences encountered one or more vehicles such as, for example, by a fleet of vehicles. Advantageously, the disclosed technology reduces the frequency and volume of data transfers between a back-office server managing a fleet ADS and each vehicle in the fleet.

BACKGROUND

It is important that an ADS functions with high reliability and integrity to reduce the risk for the vehicle occupant(s) as well as their surrounding environments to an acceptable level. Ensuring that the risk is sufficiently low requires huge amounts of data to evidence the performance of the ADS. A statistical proof that an ADS is capable of responding to all possible or statistically relevant experiences a vehicle could encounter whilst being driven could, in theory, be obtained by testing the vehicle in the field before the vehicle is sold and driven on public roads. In practice, however, capturing such test data to show how an ADS would respond to every conceivable situation a vehicle could experience would take centuries using currently available technologies. Sharing the experiences of a fleet of, for example, a hundred test vehicles, is currently estimated to require around 500 years for sufficient data to be acquired to provide such a statistical proof. As this length of time is not practical, currently ADS features installed before a vehicle is driven on public roads are made as safe as possible, and are supplemented by monitoring the ADS of the vehicle whilst it is being driven on public roads in order to ensure that the ADS is performing to the required safety levels.

Remotely monitoring each vehicle's on-board ADS performance creates certain problems. For example, when a vehicle with an on-board ADS is being driven on public roads, it will be exposed to a multitude of different experiences comprising various scenarios, behaviours and situations. Each drive generates a huge amount of data which represents the various driving experiences the vehicle encountered on that drive. If the ADS encounters a new or rare experience, it is important to share this with the monitoring entity. However, identifying when a new or rare experience has been encountered by the ADS is not straightforward.

Technically it is possible to share all of the data a vehicle sensed when on a drive with the monitoring entity, but the reality is that the sensor setups of each vehicle will generate data streams comprising huge amounts of data as the vehicle is being driven around. If all of the sensed data which an ADS on-board a vehicle utilizes when the vehicle is being driven was sent to a remote server for offline processing and analysis, the large amounts of data to be transferred could mean that, even over a very high bandwidth connection, the duration of each data transfers could be impractical. Moreover, the high bandwidth, good quality connections and the long duration of the data transfers would use up communication resources as well as power resources on each vehicle and/or the monitoring entity whenever a data transfer was attempted. For a monitoring entity such as a back-office server monitoring and managing a vehicle fleet ADS where the fleet comprises a large number of vehicles, additional complications such as congestion could arise if a large number of vehicles in the fleet transferred all the data used to configure their individual on-board ADSs to the back-office server at the same time.

SUMMARY

The present disclosure seeks to mitigate, alleviate or eliminate one or more of the above-identified deficiencies and disadvantages in the prior art to address various problems relating to experience management for automated or autonomous driving system.

Some embodiments of the disclosed technology relate to managing experiences for a vehicle (or a fleet of vehicles) which each have an on-board ADS when they are deployed in the field (for example, being driven on public roads by users who have purchased or leased vehicles with the on-board ADS). A fleet of vehicles as used herein accordingly does not imply common ownership or similar model, merely that the vehicles are associated with a fleet server system.

The disclosed technology comprises methods and related aspects set out below, and in the detailed description, and claims, which seek to identify new driving experiences encountered by an ADS on-board a vehicle to improve the way in which the new driving experiences are remotely monitored and managed. Some aspects relate to a system for sharing new driving experiences is disclosed comprising server-side technology and vehicle-side technology. Some aspects relate to, on the server-side, a fleet server which remotely monitors the ADS on-board each vehicle in the fleet. Some aspects relate to, on the vehicle side, a vehicle which comprises a machine-learning model, for example, an autoencoder, based anomalous behaviour detection system, ABDS, which is configured to identify new experiences that the vehicle encounters.

A first aspect of the disclosed technology comprises a method, for example, a computer-implemented method, for managing and/or monitoring an Automated Driving System, ADS, of a vehicle, for example, a method of ADS driving experience management and/or monitoring on a vehicle, comprising: obtaining, using the ADS, a data stream of experiences comprising behavioural data for a surrounding environment of the vehicle; detecting, using a machine-learning classification system trained to identify anomalous experiences encountered by the vehicle 1, anomalous behavioural data in the data stream of experiences encountered by the vehicle 1; extracting the anomalous behavioural data representing an anomalous experience from the data stream; and transmitting, responsive to a triggering event, the extracted anomalous behavioural data to a remote server. The machine learning classification system model preferably comprises autoencoder trained to exaggerate the reconstruction error of any input representing the anomalous behaviour associated with a new ADS experience.

Some embodiments of the disclosed technology use a machine learning model, for example, an autoencoder, which is trained to assess the experiences a vehicle encounters and to classify the experiences as new (meaning new or rare) experiences or as known (meaning previously used to configure or develop the ADS model of the on-board ADS) experiences. Advantageously, by using an autoencoder, the reconstruction error properties of the autoencoder can be used to exaggerate anomalous behaviours in each vehicle's sensed behavioural data which allows anomalies representing new or rare experiences to be detected with more sensitivity than other machine learning data classification models may be capable of at the same level of computational complexity. In other words, it is possible to determine more accurately when a new or rare experience has been encountered by a vehicle by using an autoencoder machine learning model. By only sharing data corresponding to new experiences with a remote monitoring entity, the connection bandwidth requirements and the duration of each data transfer are less onerous.

In some embodiments, the method of ADS driving experience management and/or monitoring is used to manage and/or monitor new experiences on the vehicle. In some embodiments, the extracted experience data is used to monitor and manage the on-board ADS by, at a remote server, analysing the extracted behavioural data.

In some embodiments, the remote analysis is used, for example, from time to time, to improve a global ADS, and the improvements may be communicated, from time to time, to the vehicle's on-board ADS.

In some embodiments, the analysis of the behavioural data received from the vehicle and/or analysis of behavioural data received from one or more other vehicles by the remote server may trigger a change in one or more parameters of the ADS model, such as a safety margin, and/or a change in operation or availability of one or more features of the ADS, which may be localized to a particular geographic area or locality, which are then provided to the vehicle and/or to the one or more other vehicles, and the method of ADS driving experience management and/or monitoring may further comprise receiving such data from the remote server.

An ADS experience comprises a driving experience which is represented by object-level behavioural data. Only anomalous data which is above a threshold for the detection anomalies set for the machine-learning algorithm comprises data representing a new ADS experience. The object-level behavioural data comprise sensed object-level data, for example, sensory information which tracks a sensed object, and may in some embodiments include or be associated with other data representing weather, road conditions, geographic or locality information.

In some embodiments, the machine learning system comprises an autoencoder trained or retrained using an ADS experience data library, wherein the training results in output from the autoencoder distinguishing between behavioural data associated with experiences included in the ADS experience data library and anomalous behavioural data comprising data not associated with experiences included in training data.

In some embodiments, the method further comprises updating 108, 312, using the extracted 106 behavioural data, a data library of anomalous experiences on-board the vehicle for use in retraining the autoencoder 16.

In some embodiments, the method further comprises retraining the autoencoder 16 using the updated data library of anomalous experiences on-board the vehicle. In some embodiments, the autoencoder is a variational autoencoder.

By using an autoencoder algorithm, anomalous behaviour can be more easily detected as the reconstruction error will exaggerate input data that was not included in the training data. Any suitable autoencoder model algorithm can be used providing it has sufficient input dimensionality to process at least the sensed object-level behaviour representing either a scenario and/or a bufferful of data, for example, a 30 second buffer of sensed object-level data. By training the autoencoder using the object-level behavioural data used to configure and/or develop the ADS, any new object-level behavioural data not included in the training data for the autoencoder should be distinguishable from the training data in the decoded output of the autoencoder by having a larger reconstruction error.

In some embodiments, a threshold is set for the reconstruction error to distinguish output from the decoding layer of the autoencoder which was not included in the training data for the autoencoder and which may be classified as an anomaly from output which was included in the training data. Any suitable autoencoder model may be used.

For example, in some embodiments, the dimensionality reduction which the autoencoder applies to the input data via its encoding layer through one or more hidden layers is configured to be appropriate to achieve a level of reconstruction error in the output of the decoding layer of the autoencoder which enables anomaly recognition. In some embodiments, the threshold for the reconstruction error to indicate the output was not included in the training data is dependent on the amount of dimensionality reduction of the one or more hidden layers of the autoencoder.

In some embodiments, obtaining the data stream comprises obtaining at least a stream of sensed object-level data comprising information about a surrounding environment of the vehicle, and detecting anomalous behavioural data in the data stream comprises: inputting behavioural data segments determined from the stream of sensed object-level data into the autoencoder; determining a reconstruction error for the input behavioural data using the autoencoder; and, based on the determined reconstruction error exceeding a threshold for known behavioural data, determining the input behavioural data comprises anomalous behavioural data.

In some embodiments, the autoencoder is trained using a data library of experiences comprising behavioural scenario data, inputting behavioural data segments comprises inputting data representing identified behavioural scenarios into the autoencoder, the behavioural data segments are determined by identifying behavioural data in the scenarios identified in the behavioural data stream, and determining a reconstruction error for the input behavioural data comprises determining a reconstruction error for the behavioural data of each input scenario using the autoencoder, determining the input behavioural data comprises anomalous behavioural data comprises determining the input scenario is a scenario which includes anomalous behavioural data, and extracting behavioural data representing the new experience from the data stream comprises extracting parameters representing the anomalous behavioural data from the input scenario.

In some embodiments, determining the reconstruction error comprises: reconstructing, using the autoencoder, a behavioural data segment input into the autoencoder; comparing the determined reconstructed segment of behavioural data with the input segment of behavioural data; and, based on the comparison, determining a level of reconstruction error for the input segment of behavioural data.

In some embodiments, detecting anomalous behavioural data comprises determining the level of reconstruction error is above a maximum reconstruction error level.

In some embodiments, the transmitting comprises transmitting in addition or instead an updated algorithm representing the retrained autoencoder model and/or one or parameters for the retrained autoencoder model to the remote server.

In some embodiments, the method further comprises receiving from the server one or more or all of the following updates: an experience update comprising either an update for the on-board data library of anomalous experiences for training the autoencoder; an autoencoder update comprising an updated autoencoder algorithm; and an update to the operational margins of the on-board ADS.

A second aspect of the disclosed technology comprises a system for management and/or monitoring of an Automated Driving System, ADS, for example, a system for monitoring and managing ADS experiences encountered by an Automated Driving System, ADS, on a vehicle using a machine-learning classification system configured to identify new experiences encountered by the ADS based on its training using behavioural data for experiences known by the ADS, the system comprising memory and control circuitry configured to perform one or more or all of the method steps of the first aspect. The machine learning classification system preferably comprises an autoencoder trained to exaggerate the reconstruction error of any input representing the anomalous behaviour associated with a new ADS experience.

A third aspect of the disclosed technology comprises a vehicle comprising: an Automated Driving System, ADS; a machine learning classification system; a perception system comprising at least one sensor configured to monitor a surrounding environment of the vehicle; a localization system configured to monitor a position of the vehicle; and a system for monitoring experiences encountered by the ADS of the vehicle according to the second aspect. The machine learning classification system preferably comprises an autoencoder trained to exaggerate the reconstruction error of any input representing the anomalous behaviour associated with a new ADS experience.

A fourth aspect of the disclosed technology comprises a server configured to manage and/or monitor Automated Driving System, ADS, experiences of an ADS of a fleet comprising a plurality of vehicles, wherein the server comprises a memory storing computer executable instructions and control circuitry including at least one processor or processing circuitry configured to load and execute the computer executable instructions to cause the server to receive anomalous experience update data from at least one of the plurality of vehicles, store the anomalous experience update data for processing to update a global data library of anomalous ADS experiences and/or a global machine learning classification model algorithm; and transmit, if the global data library was updated, the stored data representing the updated global data library of anomalous ADS experiences and/or, if the global machine learning classification model algorithm was updated, an indication of the updated algorithm, to each of the plurality of vehicles forming the fleet.

In some embodiments, a remote ADS monitoring entity comprises a fleet server configured to manage a plurality of vehicles. By enabling the fleet server to receive information about the new experiences that each ADS on board a vehicle in the fleet of vehicles has encountered, the new experience data can be analysed to better understand, at the fleet level, what new experiences are being encountered. The fleet server then make certain decisions based on the analysis of the new experiences. For example, whether to change the operational safety margins and/or if the ADS should be disabled in a particular geographic area if a statistically large number of new experiences are encountered in that particular geographic area which the ADS model on-board each vehicle was not configured to handle. The fleet server can then share any changes with the fleet of vehicles.

In some embodiments, the server is configured to manage and/or monitor new experiences encountered by a fleet of vehicles. In some embodiments, the server comprises a fleet server for monitoring experiences encountered by a fleet ADS comprising a global ADS model and a plurality of local ADSs on-board a plurality of vehicles forming a fleet and a trained global machine learning classification system. Each local ADS is a copy of the global ADS. A new experience encountered by a local copy of the global ADS accordingly are new experiences for the global ADS. In some embodiments, the server comprises a memory and control circuitry configured to: obtain anomalous experience update data from at least one of the plurality of vehicles, the update data comprising at least one anomalous experience update, for example, a new ADS experience update; store the anomalous experience update data for processing to update a global data library of anomalous ADS experiences or storing the update data directly in a global data library of anomalous ADS experiences; and transmit either the stored data representing the updated anomalous experience data library and/or an indication of the updated global machine learning model algorithm to each of the plurality of vehicles forming the fleet. The machine learning classification system preferably comprises an autoencoder trained to exaggerate the reconstruction error of any input representing the anomalous behaviour associated with a new ADS experience.

In some embodiments, processing the update comprises retraining the autoencoder model using the updated data library of anomalous experiences, and wherein the transmitting to the plurality of vehicles forming the fleet comprises transmitting the indication of the updated global autoencoder model.

A fifth aspect of the disclosed technology comprises a computer program product comprising computer code stored on a computer-readable medium, wherein the computer code is configured, when loaded from the computer-readable medium and executed by one or more processors on a vehicle according to the third aspect causes the one or more processors to perform steps of a method according to the first aspect.

Another aspect of the disclosed technology comprises apparatus comprising means to perform any one of the above method aspects. For example, apparatus such as control circuitry.

Some embodiments of the apparatus or control circuitry comprise modules configured to perform any one of the disclosed method embodiments. In some embodiments, the control circuitry comprises at least one processor module and/or processing circuitry.

Some embodiments of the apparatus or control circuitry comprise a memory module, at least one processor module or processing circuitry, and computer code stored in the memory module which, when executed by the at least one processor module or processing circuitry, causes the apparatus or processing circuitry to perform any one of the disclosed method embodiments.

In some embodiments, a machine executable computer-program product comprises computer code which, when executed on the apparatus or control circuitry, causes the apparatus or control circuitry to perform any one of the disclosed method embodiments.

In some embodiments a computer program, comprises machine executable instructions which, when executed in any of the disclosed apparatus or control circuitry embodiments configured or operated using computer program or computer code, cause the apparatus or processing circuitry to carry out any one of the disclosed method embodiments.

Another aspect of the disclosed technology comprises apparatus comprising: memory, an embodiment of the disclosed computer program product stored in the memory; and one or more processors or processing circuitry, wherein when the one or more processors or processing circuitry load the computer code from the memory an execute the computer code, the apparatus and/or processor circuitry is causes to implement any of the disclosed method embodiments.

Further preferred embodiments of the disclosure are defined in the accompanying claims. These and other features and advantages of the present disclosure will in the following be further clarified.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

It is to be understood that the invention is disclosed by way of various example embodiments and is not intended limited to particular embodiments disclosed, but is defined by the scope of the accompanying independent claims and corresponding aspects, and by the preferred embodiments disclosed herein and by the corresponding dependent claims.

BRIEF DESCRIPTIONS OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

Figures 3C, 4:
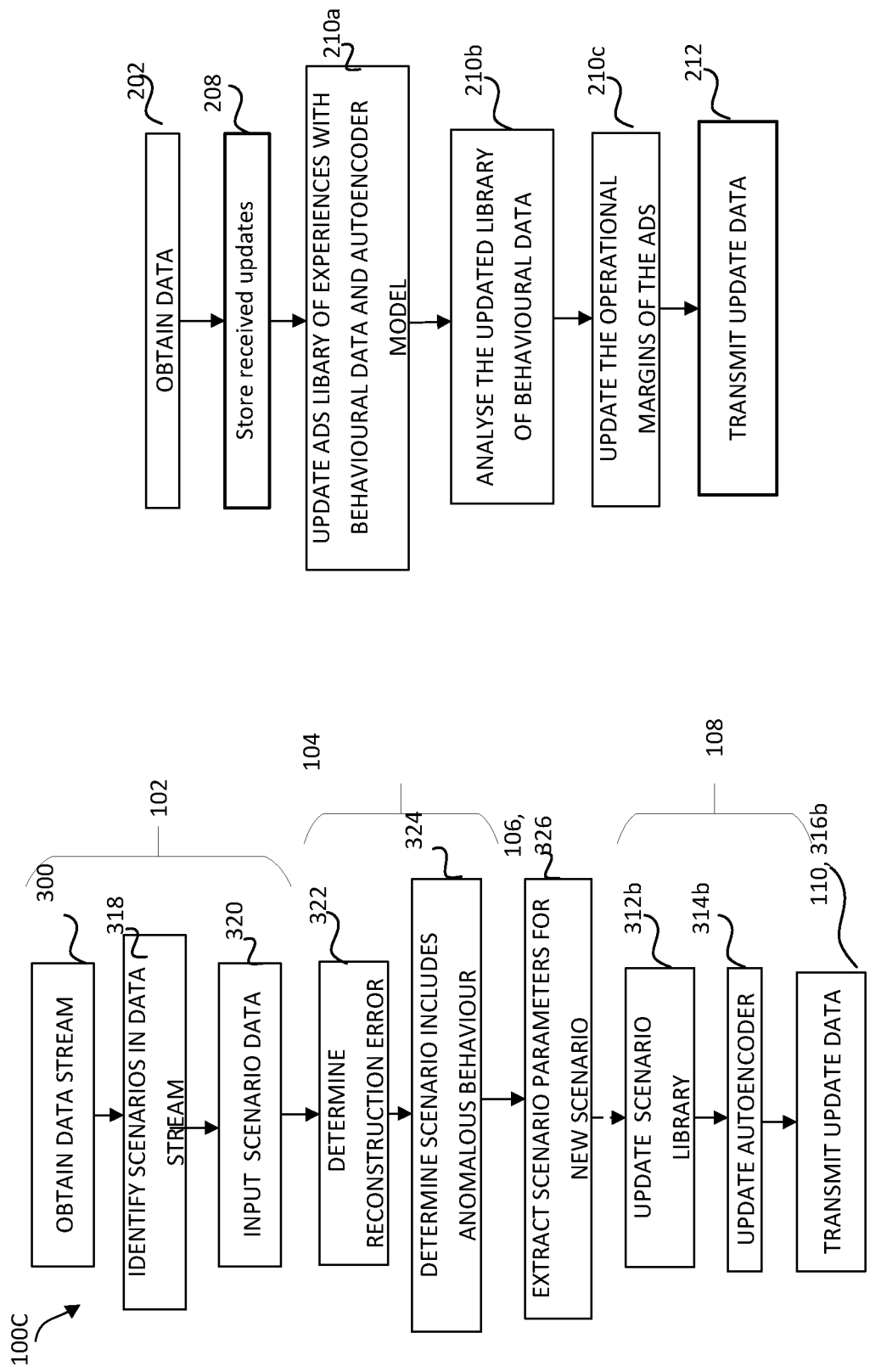
Figure 5A:
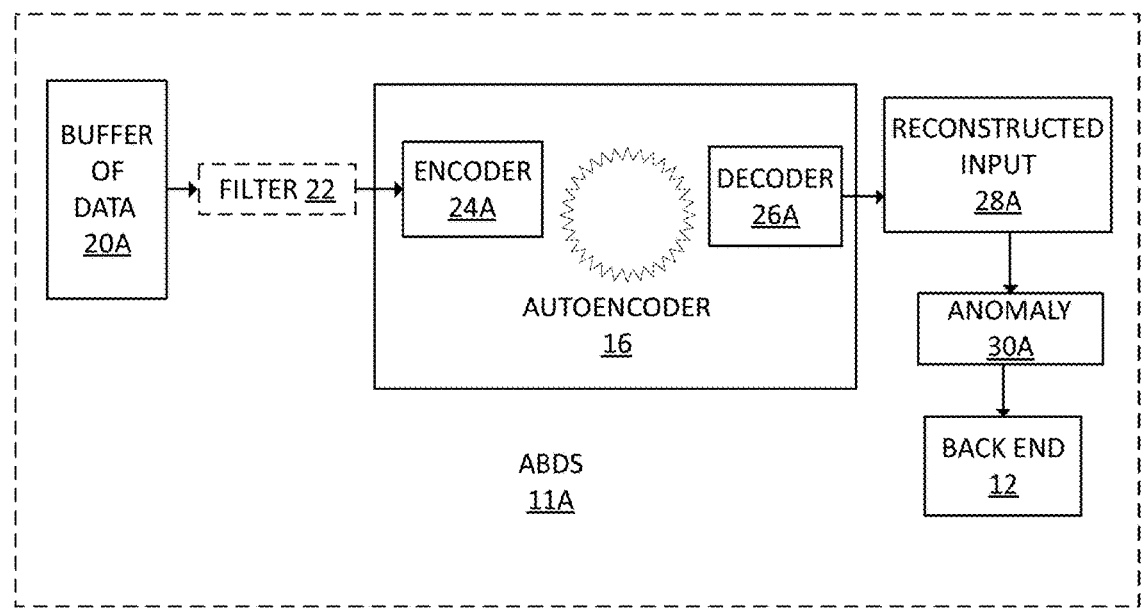
Figure 5B:
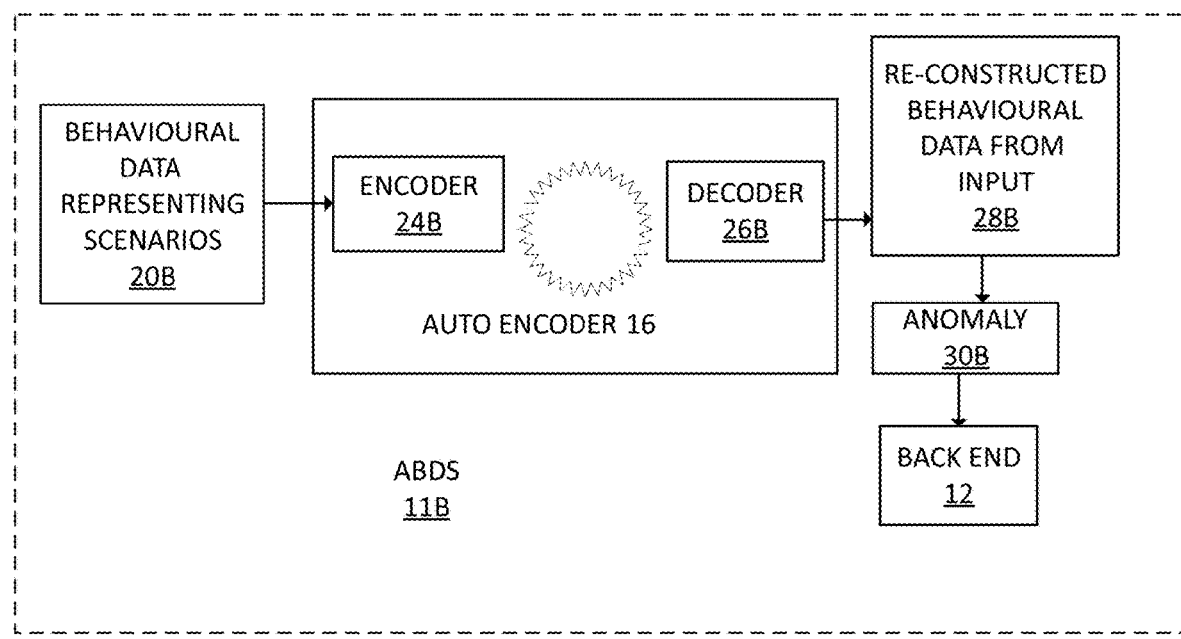
Figure 6:
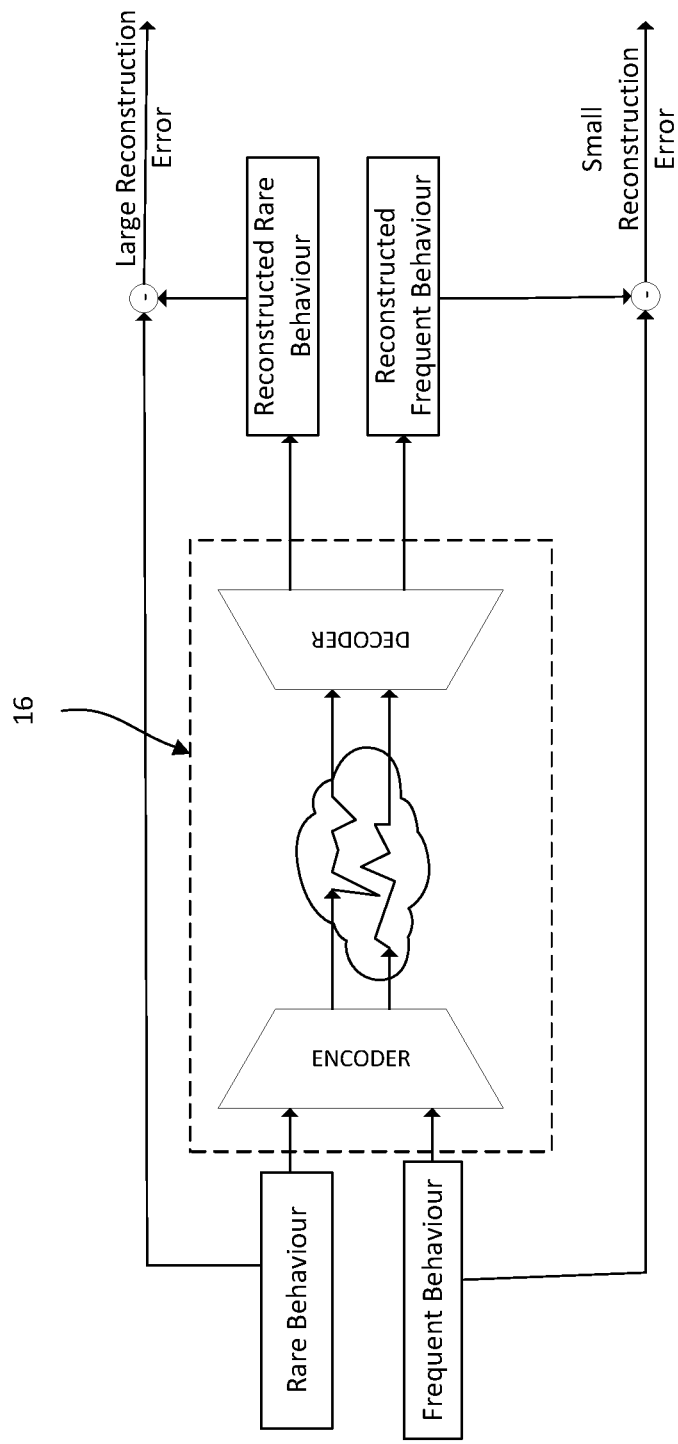
Figure 8A:
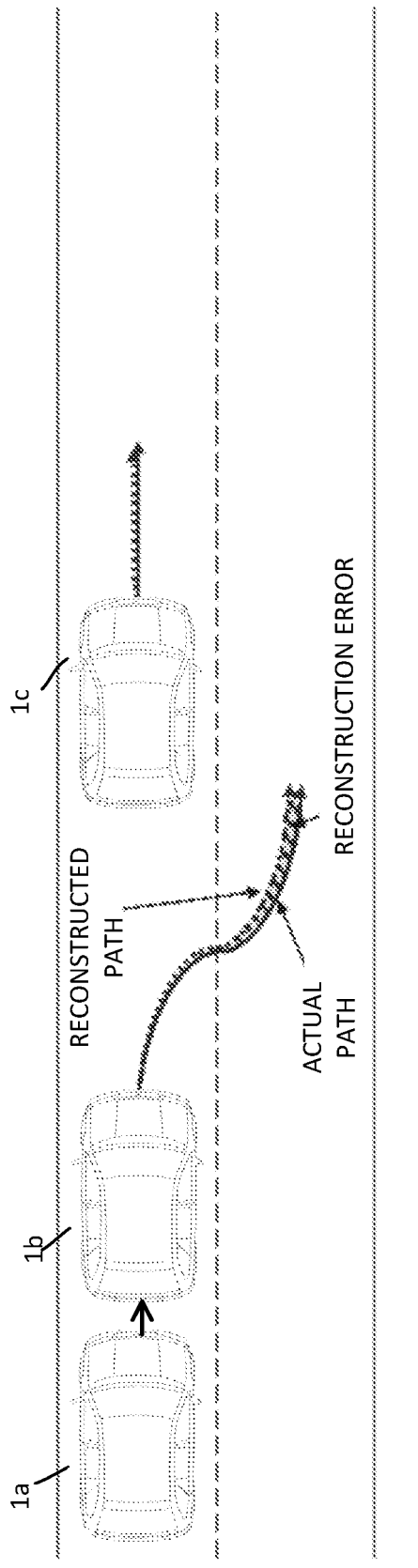
Figure 8B:
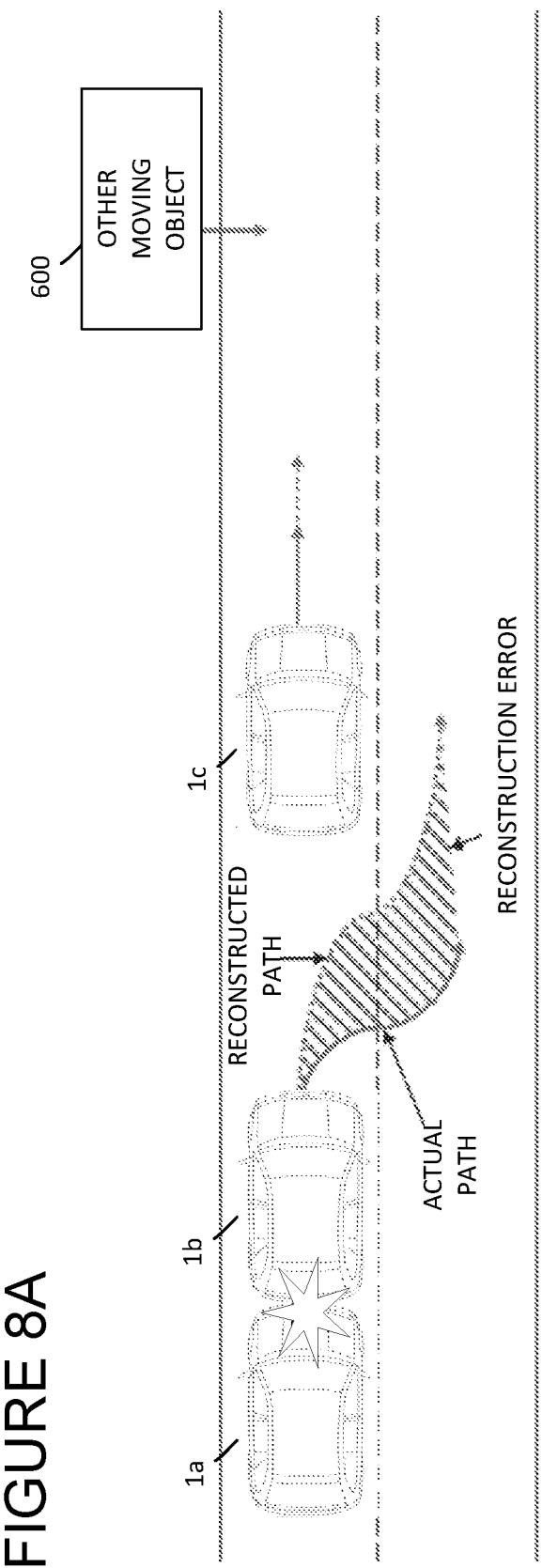

FIGS. 3A, 3B, and 3C show schematic representations of steps in example methods for monitoring experiences encountered by an ADS on-board a vehicle using an autoencoder in accordance with some of the disclosed embodiments;

FIG. 4 shows schematically steps in a method of updating an ADS model in accordance with some of the disclosed embodiments;

FIG. 5A shows an example schematic illustrating how an autoencoder may be used to detect anomalous behavioural data to provide updates to a fleet server in accordance with some of the disclosed embodiments;

FIG. 5B shows an example schematic illustrating how an autoencoder may be used to detect anomalous scenarios to provide updates to a fleet server in accordance with some other disclosed embodiments;

FIG. 6 shows an example schematic illustrating how an autoencoder is used to detect anomalous behavioural data in accordance with some of the disclosed embodiments;

FIG. 7A shows a schematically steps in a method performed by an autoencoder for identifying anomalies is a behavioural data stream in accordance with some of the disclosed embodiments;

FIG. 7B shows a schematically steps in a method performed by an autoencoder for identifying anomalies in a scenario data in accordance with some of the disclosed embodiments; and FIGS. 8A and 8B provide together schematic overhead views of scenarios which illustrate how anomalous sensed behaviour generates an exaggerated reconstruction error in accordance with some of the disclosed embodiments.

DETAILED DESCRIPTION

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in apparatus comprising one or more processors, one or more memories coupled to the one or more processors, where computer code is loaded to implement the method. For example, the one or more memories store one or more computer programs that perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps.

It should be emphasized that the term "comprises/comprising" when used in this specification is taken to specify the presence of stated features, integers, steps, or components. It does not preclude the presence or addition of one or more other features, integers, steps, components, or groups thereof.

The following description provides examples of various methods and related aspects which seek to improve the performance of Automated Driving Systems (ADSs) by allowing for more timely updates and by reducing the amount of data that needs to be transferred from a vehicle to a back-office server that controls a fleet ADS for a fleet of vehicles including that vehicle.

An increasing number of modern vehicles have one or more advanced driver-assistance systems (ADAS) to increase vehicle safety and more generally road safety. Examples of ADAS include adaptive cruise control, ACC, collision avoidance system, forward collision warning, all of which are electronic systems installed in a vehicle with the aim of aiding a vehicle driver while they are driving the vehicle. To function as intended, an ADAS may rely on inputs from multiple data sources, such as e.g. automotive imaging, LIDAR, radar, image processing, computer vision, and/or in-car networking. Currently, development is ongoing in both ADAS and also Autonomous Driving (AD) and there are a number of different technical areas within these fields.

Some examples of modern ADSs comprise complex combinations of various components forming one or more systems which perform perception, decision making, and operation of the vehicle using electronics and machinery instead of a human driver and which can also introduce automation into road traffic. Some examples of ADSs can handle a vehicle, drive it to its destination, and maintain an awareness of surroundings and while the automated system has control over the vehicle, which allows the human operator to leave all responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage. The common term Automated Driving System (ADS) is used herein to refer to both ADAS and AD and corresponds to all of the different levels of automation as for example defined by the SAE J3016 levels (0-5) of driving automation.

The disclosed embodiments allow ADSs on board vehicles to be remotely monitored by a central server as the vehicles are driven so that as new experiences or situations are encountered by the vehicles these can be shared with other vehicles to update their ADSs. As mentioned above, using current technologies, monitoring an ADS requires a large volume of sensor data to be transferred to the central monitoring entity. Assuming that the size of the ADS fleet will increase rapidly in the future, solutions relying on each vehicle in a fleet sending raw sensor data are increasingly infeasible and regulatory issues can further impact how data is shared.

Figure 1:
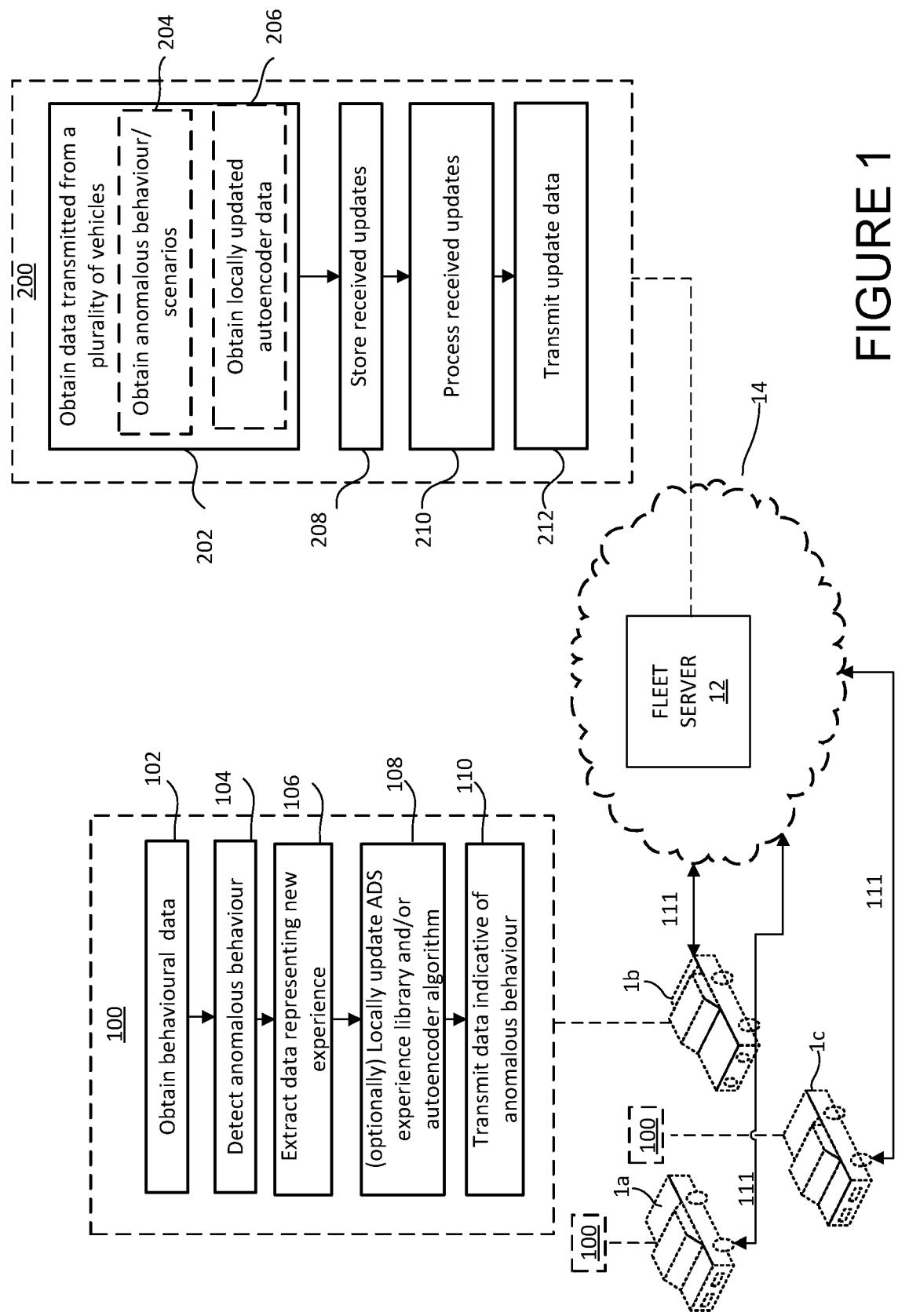
FIG. 1 is a schematic representation of a distributed system for monitoring experiences encountered by a fleet ADS system using autoencoders in accordance with some of the disclosed embodiments.
Figure 2:
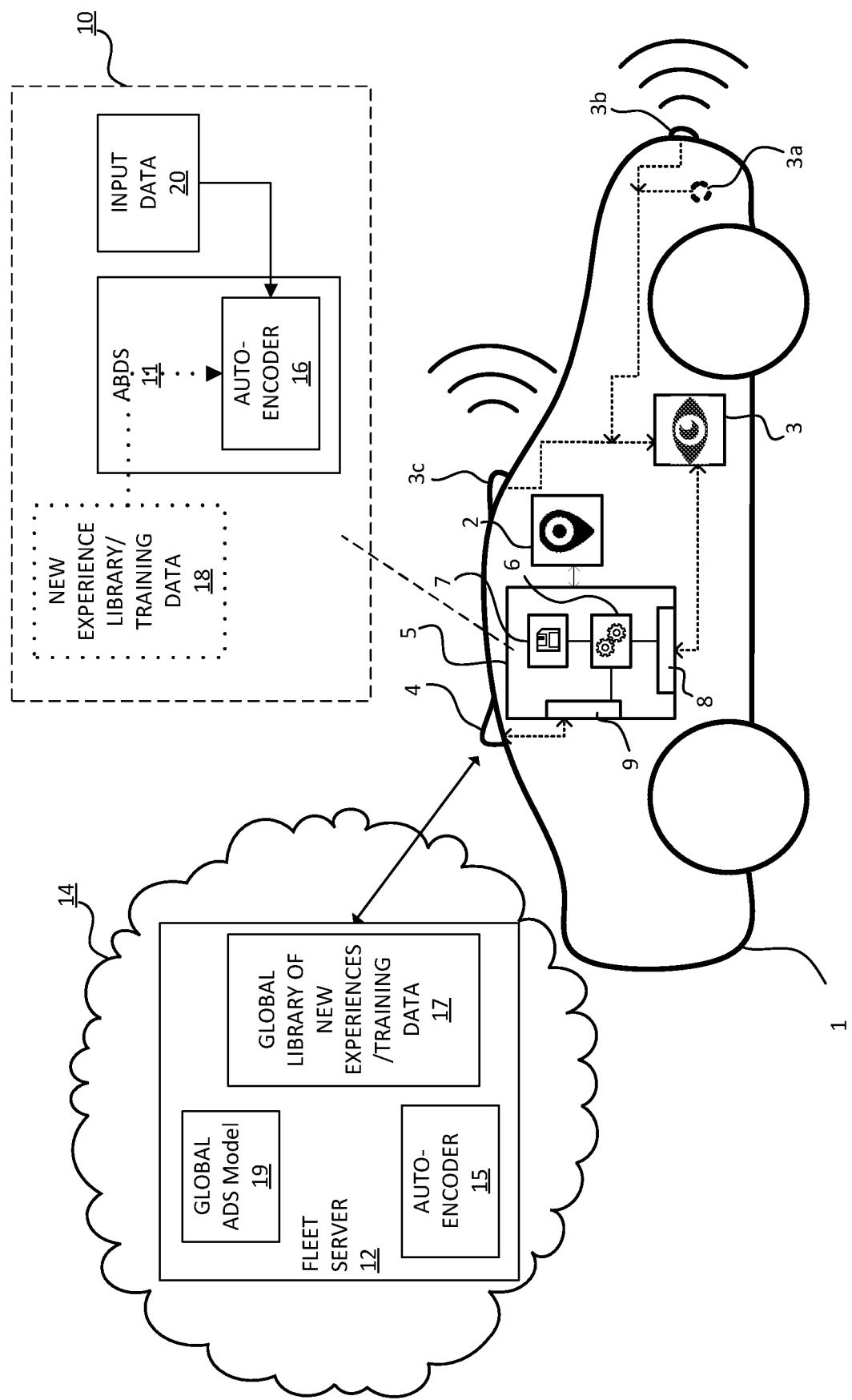
FIG. 2 is a schematic side view of a vehicle including an autoencoder for use in monitoring experiences encountered by an on-board ADS in accordance with some of the disclosed embodiments.

FIG. 1 of the accompanying drawings shows an example embodiment of a distributed system for remotely monitoring experiences encountered by a vehicle fleet. As illustrated, the system comprises a remote, central, back-office or back-end server 12 referred to herein as fleet server 12 and a fleet comprising plurality of vehicles 1 (shown in FIG. 1 as vehicles 1a, 1b, 1c). FIG. 2, described in more detail later below, shows schematically how the fleet server 12 includes a fleet ADS comprising a central or global ADS model 19 and a global data library of ADS experiences 17, and a central or global machine learning classifier shown as auto-encoder model 15 which are used to configure the global ADS. Those of ordinary skill in the art will appreciate that fleet server 12 also comprises a suitable memory and control circuitry, for example, one or more processors or processing circuitry, as well as one or more other components such as a data interface and transceiver, and may also include software modules or other components, such that the control circuitry can be configured to execute machine-readable instructions loaded from memory to implement the remote method of managing and/or monitoring driving experiences encountered by each vehicle's on-board ADS disclosed herein.

The fleet ADS is used to monitor and manage local ADS 10 which are copies of the global ADS 19 on board each vehicle 1a, 1b, 1c in the fleet and local copies of the global machine learning classifier 15 comprising local machine learning classifiers such as autoencoders 16 on-board each vehicle 1a, 1b, 1c in the fleet. The fleet server 12 also pushes out updates to the local data libraries 18 of experiences on-board each vehicle 1a, 1b, 1c so that the same data library of experiences 18 is made available for use by the local ADS 10 on-board each of the vehicles 1a, 1b, 1c in the fleet.

Each vehicle 1 performs a method 100, for example a computer-implemented method, such as method 100a, 100b, or 100c as described in more detail later on, for monitoring experiences encountered by an Automated Driving System, ADS, 10 on-board that vehicle 1. The method 100 comprises in some embodiments: obtaining (step 102), using the ADS 10, a data stream of experiences comprising sensed behavioural data for a surrounding environment of the vehicle 1, detecting (step 104), using a machine-learning classification system 16 trained to distinguish new experiences from experiences known to the ADS in the data stream of experiences encountered by the vehicle 1, anomalous behavioural data, extracting (step 106) the anomalous behavioural data representing an anomalous experience from the data stream; and transmitting (step 110), responsive to a triggering event, the extracted behavioural data to a remote server, such as the fleet server 12 shown in FIG. 1 and described in more later below.

The following description refers to the machine learning model classifier being exemplified by an autoencoder. There are some additional technical benefits to the ML model classifier comprising an autoencoder, as this type of ML model will inherently exaggerate the differences between known and new experiences. Nonetheless, references to the term autoencoder should also be considered references to any other suitable type of machine learning classifier model unless the context clearly dictates implicitly or explicitly otherwise.

In some embodiments, the machine learning classification system comprises an autoencoder 16 trained using an ADS experience data library to distinguish between behavioural data associated with experiences included in the ADS experience data library and behavioural data associated with an anomalous experience, in other words a new experience not included in the ADS experience data library used to train the autoencoder.

The fleet illustrated in FIG. 1 comprises three vehicles 1a, 1b, 1c by way of example only. As the vehicles are driven, they each encounter new experiences. When a new experience is encountered, meaning an experience which was not used to configure or develop that vehicle's ADS and not previously detected and used to train the autoencoder, it is later shared by the vehicle encountering it, for example, vehicle 1a with the fleet server 12. A vehicle may report each new experience as it is detected but may also store new experiences until a suitable connection opportunity presents itself or based on a scheduled time to send new experience updates to the server.

The fleet server 12 stores received experiences in a global data library of new experiences sent in by all of the vehicles of the fleet. The fleet server may use the global data of new experiences to retrain the global autoencoder model 15 to send out updates for the autoencoder model to the fleet of vehicles so they can perform local updates to prevent double detection of new experiences.

The server 12 may also analyse the experiences for other purposes, for example, to determine if any changes are needed to the global ADS model 19 and/or any of its operational parameters. For example, the server 12 may keep a statistical count of new experiences of the same type or which have one or more features in common.

For example, the safety margins of the global ADS may be adjusted by the server 12 responsive to the server 12 analysing new experiences encountered by the fleet at a particular geographic location in some embodiments and/or the on-board ADS of the vehicles may be configured to be turned off at that location. An example of how safety margins could be changed to allow more conservative (i.e. safe) driving, is to increase the gap between the ego vehicle and the vehicle ahead, for example, from a 2 second gap to a 4 second gap. The experience data updates and/or any other updates such as updates to the global autoencoder algorithm (and in some embodiments, updates to the global ADS model 19) are from time to time pushed out by the fleet server 12 to the other vehicles 1b, 1c in the fleet so that they can make corresponding local updates. This way, for example, each vehicle can update its own data library of new experiences 18 and use this to retrain their on-board own autoencoder models and/or directly update their local autoencoder model using a received autoencoder model algorithm update.

In some embodiments, a local copy of the global ADS model 19 may also be updated with new operational margins. In some embodiments of the server 12, the ADS is configured for an Operational Design Domain, ODD, and instructions executed by the processing circuitry cause the server to: perform a statistical count of new experiences associated with a particular geographical area within an operational environment of the ADS; compare the statistical count of new experiences against a predefined statistical count; determine if the statistical count indicates that one or more predefined requirements for the ODD are not fulfilled within the geographical area based on the comparison; and if so, inhibit activation of the ADS within the geographical area.

The server autoencoder and/or new experience data updates can prevent subsequent exposures to the same experience from being treated as a new experience by the other vehicles 1b, 1c in the fleet. The local autoencoders 16 on-board each vehicle 1b, 1c, can be updated either by receiving an update to the autoencoder model algorithm they use from the fleet server 12 or by being retrained using an updated data library of experiences received from the fleet server 12. In some embodiments, the vehicle 1a also locally updates its own autoencoder model by retraining it when a sufficient number of new experiences have been encountered without waiting for an update from the fleet sever 12. The retraining and/or updating can happen repeatedly as new experiences are detected.

Although the autoencoder could be retrained whenever a new experience becomes available in the library, it is preferably to wait until a certain number of new experiences are accumulated and then the autoencoder can be retrained on the data library of new experiences. For example, what triggers the retraining may also be a certain fullness of the memory storing the data library of new experiences in some embodiments and/or if a lot of new experiences are encountered in a short period of time. In this case, the vehicle 1 may also, in some embodiments, send an update for its autoencoder model algorithm to the fleet server 12. This may allow faster updates to the other autoencoder model algorithms of other vehicles 1b, 1c in the fleet, as there is no need for the fleet server 12 to wait until the global autoencoder model 15 has been retrained and the global autoencoder algorithm updated to send updates to the other vehicles 1b, 1c in the fleet.

If there are regulatory, legal or privacy constraints about how data representing the new experiences extracted from the vehicle can be shared with a remote fleet server, these are avoided by having the autoencoder updated locally in the vehicle and only the updated model and/or its parameters are transferred to the fleet server. In other words, a federated learning scheme can be used in some embodiments which updates models locally in the edge (i.e. on each vehicle 1a, 1b, 1c), transfers each of the updated models to the fleet server 12 and then consolidates the received updated models to form an updated global model.

The updates to and from the fleet server 12 and each vehicle 1a, 1b, 1c in the fleet are transmitted over communications links 111 over a wireless or radio access network 14. These updates may include one or more updates to the on-board data library of experiences which may then be used to retrain the autoencoder and/or analysed to provide updates to the on-board ADS model, for example, provide an update to any operating parameters such the safety margins used by the on-board ADS, and/or updates to the parameter or algorithm of the autoencoder model 16 used by each vehicle in the fleet. In general, the ADS on a vehicle does not need to use an on-board data library to be able to operate rather the parameters of the ADS 10 are tuned and its safe performance is verified using the library of experiences in the back office. Subsequently, an update for the retuned ADS 10 can be pushed out to the fleet vehicles 1.

The local on-board autoencoder models 16 and the global autoencoder models 15 used by the fleet server 12 comprise a variational autoencoder model in some embodiments. A person of ordinary skill in the art will realise that there are many possible examples of an autoencoder which could be trained using object-level sensory data in the form used to configure and/or train an on-board ADS. Some examples can be found in the following references of autoencoders which are suitable for being adapted to be trained based on object-level data, such as the sensory information behavioural object-level data of the disclosed embodiments: Liu, Hai-Long, et al. "Visualization of driving behavior using deep sparse autoencoder." 2014 *IEEE intelligent Vehicles Symposium Proceedings*. IEEE, 2014, Sarna, Kyle, et al. "Driving feature extraction and behavior classification using an autoencoder to reproduce the velocity styles of experts." 2018 21st *International Conference on Intelligent Transportation Systems (ITSC)*. IEEE, 2018, Xie, Jie, Allaa R. Hilal, and Dana Kulić. "Driving maneuver classification: A comparison of feature extraction methods." *IEEE Sensors Journal* 18.12 (2017): 4777-4784.

The global autoencoder model is initially trained using behavioural data for known experiences which each vehicle's ADS may encounter. The same autoencoder model as the global autoencoder is also provided on each vehicle 1a, 1b, 1c of the vehicle fleet. The autoencoder models used by the fleet server 12 and on-board each vehicle can be independently updated either by being retrained or by having the autoencoder model algorithm directly updated. The central autoencoder model used by the fleet server 12 is updatable using update data provided to the fleet server 12 from at least one of the plurality of vehicles for example, vehicles 1a,1b, 1c shown in FIG. 1 via communication links 111 over a wireless or radio access network 14. Autoencoder updates from the fleet server 12 to each vehicle 1a, 1b, 1c can also be transmitted over communications links 111 over radio access network 14.

Each vehicle 1a, 1b, 1c in the fleet includes a control system 5 (see FIG. 2) which performs a method 100 for monitoring experiences encountered by its own on-board ADS according to any of the disclosed embodiments. In one embodiment, the method comprises method 100, 100a, 100b, 100c for monitoring new (as in new or rare) experiences of an Automated Driving System, ADS, 10 of a vehicle 1, the method comprising: obtaining 102, using the ADS 10, a data stream of experiences comprising behavioural data for a surrounding environment of the vehicle 1; detecting (step 104, 308, 324), using a machine-learning model such as an autoencoder 16 trained to identify anomalous experiences encountered by the vehicle 1, anomalous behavioural data in the data stream of experiences encountered by the vehicle 1, extracting (step 106) behavioural data representing an anomalous experience from the data stream, and transmitting (step 110), responsive to a triggering event, the extracted behavioural data to a remote server 12.

The anomalous behavioural data detected by the autoencoder or other suitable machine-learning models represent a new experience encountered by the vehicle 1. An autoencoder advantageously is a machine-learning model that performs very poorly if given data it has not been trained on. This means that providing the autoencoder is trained using experiences that were included in the data set used to configure or develop the ADS, when given a new or rare experience that was not included in the data used to configure or develop the ADS, the reconstruction error will exaggerate the anomaly allowing for new experiences to be detected more easily.

The triggering event in some embodiments may be the completion of the previous extracting step 106. In other embodiments, the method 100 further comprises storing the extracted behavioural data and later transmitting it responsive to the triggering event. Examples of triggering events could include a certain amount of time elapsing since the last update was sent, the memory in which the anomalous behavioural updates are being stored until they can be transferred to the fleet server 12 reaching or exceeding a certain level of fullness, or a certain number of new experiences having been detected since the last update was sent to the fleet server.

The machine learning model or autoencoder 16 on-board a vehicle 1a, 1b, 1c is trained using training data comprising a data library of new ADS experiences. Once trained, the autoencoder is configured to reconstruct the training data when input as output in a well-behaved manner, in other words with no or low reconstruction errors. However, for any data not included in its training data, there will be a larger reconstruction error than would be the case if the data had been included in the training data set. In this way, the autoencoder can distinguish between behavioural data associated with experiences included in its training library, in other words, experiences known to the ADS, and anomalous behavioural data comprising data not associated with experiences included in the training data, on other words, new experiences not previously known (as in used to configure or develop) the ADS model. This means that the initial version of the on-board autoencoder is trained to be able to successfully reconstruct behavioural data representing experiences which were used to configure and/or develop the on-board ADS model 10. The autoencoder however will not be capable of reconstructing to the same level of success any data representing a new ADS experience that it has not been trained on.

The autoencoder model algorithm 16 is also capable of being reconfigured using autoencoder model algorithm updates received from the fleet server 12. In some embodiments, the autoencoder updates are indirect, as the autoencoder can be retrained using the experience data updates to the data library of local experiences used to configure the ADS 10 on-board the vehicle when this receives an update from the fleet server 12. In this manner, the local autoencoder model 16 of each vehicle of the fleet can be updated to conform to the global autoencoder 15. Advantageously, this prevents the behavioural data for any already updated experience(s) from being detected again as anomalous behaviour by the autoencoders on-board each vehicle in the fleet. The operation of the autoencoder is described in more detail later below.

In some embodiments of method 100, a behavioural data stream is suitably segmented in time, for example, buffered, and this allows one buffer at a time of the data stream to be input in step 102 into the autoencoder 16. The behavioural data stream includes at least a stream of sensed data from a perception system 3 of the ADS (see FIG. 2) and may include data streams from at least one other source. Data segments in the data stream which represent a new situation or experience previously not encountered by that ADS are detected (step 104) using the autoencoder 16 anomalous behavioural data in the input stream. The anomalous behavioural data representing the new situation or experience is then extracted from the input data (step 106) and transmitted 110 to the fleet server 12 to allow it to update the global data library of new ADS experiences 17. The global autoencoder model 15 can then be retrained using the updated ADS experience update data 17. In some embodiments, the vehicle will locally retrain its autoencoder using the new experience data first as it allows the vehicle to send the updated autoencoder algorithm directly. In some embodiments, the vehicle 1a will also update (step 108, 312), using the extracted 106 behavioural data, a local data library 18 of experiences on-board the vehicle 12. This update can be used to retrain the autoencoder locally and/or it can be analysed locally and used to configure the on-board ADS 10 without waiting for an update from the fleet server 12. The transmitting 110, 316, 316b step accordingly may also include in some embodiments of method 100 transmitting an updated algorithm representing the retrained autoencoder model and/or one or parameters for the retrained autoencoder model to the remote server 12.

Method 100 accordingly enables the amount of data that would otherwise need to be transferred to the fleet server 12 in step 110 by a vehicle reporting it has encountered a new experience to be reduced to only data representing a new experience encountered by that vehicles ADS. The amount of data that the fleet sever 12 needs to send to update the autoencoder models on each of the other vehicles in the fleet can also be reduced as once the fleet server 12 has updated its central ADS using the new experiences and/or retrained its autoencoder models based on the experience updates, updates for these models can be pushed out to all the vehicles 1a, 1b, 1c of the fleet that fleet server 12 is configured to manage. Some embodiments of method 100 accordingly further comprise receiving from the server 12 one or more of the following updates: an experience update comprising either an update for the on-board data library of new behavioural experiences for retraining the autoencoder and/or an autoencoder update comprising an updated autoencoder algorithm.

By analysing the new experiences, the fleet server can determine if it is appropriate to update the operational margins, or some other parameter of the ADS on-board each vehicle 1a, 1b, 1c in the fleet so that each vehicle can be provided with the ability to respond safely to rare situations which it was not previously configured to handle if another vehicle in the fleet happened to encounter such as situation or experience. By updating the autoencoder on-board each vehicle, each new situation or experience should be reported only once to the fleet server 12. Optionally, to avoid having to wait for a server update, in some embodiments of method 100 performed by the vehicle 1a in the fleet which encountered the new experience, the method further comprises locally updating 108 a data library of new ADS experiences which can then be locally analysed and/or used to configure and/or retraining the autoencoder algorithm with the extracted 106 behavioural data.

FIG. 1 also shows schematically on the right-hand-side an example embodiment of a server-side method 200 performed by fleet sever 12. In one embodiment, the fleet server 12 comprises a server for monitoring new experiences of a fleet ADS by obtaining (step 202) data transmitted from the plurality of vehicles 1a, 1b, 1c, shown in FIG. 1. The fleet ADS comprises a global ADS model 19 and a plurality of local ADSs 10 on-board a plurality of vehicles 1a, 1b, 1c forming a fleet. In some embodiments, the server 12 further comprises a memory storing computer executable instructions and at least one processor or processing circuitry configured to load and execute the computer executable instructions to cause the server to obtain (step 202) data by receiving (step 202) anomalous experience update data from at least one of the plurality of vehicles 1, the update data comprising at least one anomalous experience update, store (step 208) the anomalous experience update data for processing (in step 210) to update a global data library of anomalous ADS experiences 17 and/or a global machine learning classification model algorithm 15, and transmit (step 212), if the global data library was updated, the stored data representing the updated (in step 210) global data library of anomalous ADS experiences 17 and/or, if the global machine learning classification model algorithm was updated, an indication of the updated algorithm, to each of the plurality of vehicles 1a, 1b, 1c forming the fleet. In some embodiments, obtaining (step 202) data from each vehicle further comprises receiving (206) information about a locally updated autoencoder model from each vehicle.

In some embodiments, the global machine learning model 15 comprises an autoencoder model, and the updated global autoencoder model is transmitted in step 212 to a plurality of vehicles 1a, 1b, 1c forming the fleet. The global autoencoder model 15 is trained using a data library of experiences used to configure the global ADS model 19 and in some embodiments of the server 12, the instructions cause the server to: obtain 202 anomalous experience update data from at least one of the plurality of vehicles 1, the update data comprising at least one anomalous experience update; store 208 the anomalous experience update data for processing 210 to update a global data library of anomalous ADS experiences 17; and transmit 212 either the stored data representing the updated 210 anomalous experience data library and/or an indication of the updated global autoencoder model algorithm to each of the plurality of vehicles 1a, 1b, 1c forming the fleet.

In some embodiments, processing the update 210 comprises retraining the autoencoder model using the updated data library of anomalous experiences, and wherein the transmitting 212 to the plurality of vehicles 1a, 1b, 1c forming the fleet comprises transmitting the indication of the updated global autoencoder model 15.

The combination of having autoencoders 16 on each of the vehicles 1a,b,c and a central autoencoder 15 allows a fleet ADS to be updated with new experiences as they are encountered by the vehicles in the fleet more rapidly as less data needs to be transferred when a vehicle encounters a new experience. By only sending data indicative of a new experience encountered by an ADS on-board a vehicle, the amount of data to transfer is a far smaller volume than would be needed if all experience data was transferred, meaning that data transfer times are shorter and this could allow more frequent transfers to be made as connection requirements may be less stringent, for example, a connection with lower bandwidth may become suitable. As a result, the fleet server can analyse the received new experiences more quickly and if appropriate update and/or activate or deactivate one or more features of its central ADS model based on that analysis and/or retrain its central autoencoder model in a more timely manner.

Rare or infrequent experiences which otherwise might only very rarely be encountered by individual vehicles 1a, 1b, 1c when they are being driven can be shared by any vehicle which does encounter such a rare or infrequent scenario using less resources and without any need to wait for a suitable connection for what might otherwise be a very large data transfer if all experiences, both new and old, had to be shared with the fleet server 12. By providing the fleet server with the ability to monitor new experiences and analyse the new experiences, the analysis may indicate when some feature or features of the ADS need adjustment and/or suspension from service to reduce the risk for vehicle occupants as well as other objects in their surrounding environments.

By receiving updates for the central autoencoder model, each vehicle should only send updates for situations that the fleet as a whole has not encountered before which further reduces the number of updates which need to be transferred by a vehicle to the monitoring and managing fleet server 12. The manner in which each autoencoder 16 configured to identify new situations or behaviours as anomalous input data will be described in more detail below for two types of example embodiments. In some of the embodiments, anomalous behavioural data is detectable by means of reconstruction errors between reconstructed sensed or perceived behavioural data at the object level. In some other embodiments, scenario data is used to determine if a the vehicle has experience a new situation or behaviour.

As used herein, the term ADS or autonomous driving feature refers to any ADS, ADAS or autonomous driving feature, e.g. as already known in the art and/or yet to be developed which includes technology for processing sensory and other data inputs which may be used to govern what signals are provided to actuate or modify other components of the vehicle affecting its driving operation. The ADS is preferably, but not necessarily, an ADS of level 3 or higher according to the SAE J3016 levels of driving automation, such as for example a highway pilot feature, a traffic jam pilot feature, or the like. Herein, the term ADS or autonomous driving feature may refer to any arbitrary ADS, ADAS or autonomous driving feature, e.g. as already known in the art and/or yet to be developed, with the novel addition of a scenario identifier module which may be an integrated part of the ADS or a peripheral system/module/feature deployed in the vehicle.

As used herein, the term autoencoder refers to a decoding and encoding machine learning or AI model system compromising at least one encoding layer configured to encode input comprising behavioural data, at least one or more intermediate or hidden layers which further modify the encoded input, and at least one decoding layer configured to decode the output of the intermediate or hidden layers. In some embodiments, the autoencoder is trained using behavioural data comprising experiences known by, where known by means previously used to configure and/or develop, the ADS 10 to distinguish between the behavioural data representing experiences known by the ADS 10 and behavioural data representing new experiences not included in the experiences known by the ADS 10.

For example, each on-board autoencoder 16 at first (as in absent any local updates occurring) comprises a local copy of the global autoencoder model 15 used by the fleet sever 12. The global autoencoder (and local autoencoders) can be trained using known by, where known by means previously used to configure and/or develop, the ADS 10, behavioural data comprising sensed behaviours and environmental data to configure the neurons forming each encoding, hidden, and decoding layer with appropriate weights and activation functions, and may also configure biasing functions to bias some weights over other weights. In some embodiments, each hidden or intermediate layer corresponds to a particular decomposition of the input data. An example of an autoencoder which may be used by the fleet server and each fleet vehicle will be described later on referring to FIG. 6. As the vehicles 1a, 1b, 1c in the fleet encounter more experiences for the first time, the autoencoder models 16 on-board on each vehicle on the fleet can be updated, either directly as a result of their own new experiences or by receiving updates to their autoencoder models from the fleet server 12.

As used herein, the term behavioural data refers to data which comprises sensed object-level or scenario level data representing an environmental, situational, or behavioural experience, and comprises data observed and/or otherwise sensed by an ADS of an ego-vehicle and/or environmental data from any other source including mapping data, weather data etc.

In some embodiments, the behavioural data includes sensed behaviour of one or more other objects in the environment surrounding the ego-vehicle. In some embodiments, behavioural data representing an experience encountered by an ADS 10 comprises object-level data sensed by sensors of an ego-vehicle 1a, 1b, 1c, and other data representing one or more environmental conditions for a sensed environment surrounding that ego vehicle 1a, 1b, 1c. The behavioural data may include sensed behaviours of the ego vehicle itself or sensed behaviours of other objects such as animals, people or vehicles in the vicinity of the ego vehicle.

The data input to the autoencoder to train it comprises a buffer or another suitable segment of the behavioural data. To determine if new behaviour has been encountered, behavioural data captured by the ADS of the ego vehicle is fed into the trained autoencoder in the same manner as the training data. For example, one buffer-full at a time or a similar quantity of data comprising a time segment or window of a stream of behavioural data may be used, or a scenario identified by the ADS from the data stream of sensed objects etc.

In some embodiments, the input data from the sensed data stream is filtered to remove data components which are not used by the autoencoder model and/or which would not be reconstructed properly by the autoencoder model. For example, in some embodiments, a buffer of sensed object-level data is filtered to remove data objects which are determined to be too far away from the ego vehicle.

As mentioned briefly above, in some embodiments, the input data is processed first as scenario data, for example, using an scenario identifier module known in the art. A scenario identifier module is disclosed in Gyllenhammar, M., Zandén, C., and Törngren, M., "Defining Fundamental Vehicle Actions for the Development of Automated Driving Systems," SAE Technical Paper 2020-01-0712, 2020, https://doi.org/10.4271/2020-01-0712, the content of which is hereby incorporated in its entirety.

The identified scenario data is then used to train the autoencoder and then used to determine if a previously identified scenario in fact includes data representing a new scenario. The scenario identifier may be an integrated part of the ADS or a peripheral system/module/feature deployed in the vehicle in such embodiments. The scenario identifier is used by the ADS 10 of a vehicle 1 whilst it is being driven. The ADS will be exposed to a multitude of different scenarios and situations. Having a detailed understanding of these is advantageous in order to be able to construct a safe yet performant self-driving system. One way of achieving such an understanding is by creating "models" of the environment. These "models" can be created using a system that is able to characterise the events and scenarios around the ADS into a "scenario model" and further measure and quantify them. This system is herein referred to as a scenario identifier module whose output is not only the identified but also the quantified scenarios. Quantified scenarios could comprise everything from trajectories of surrounding traffic to the amount of rain or different road characteristics.

In one example situation, a scenario comprises an external vehicle overtaking the ego-vehicle 1. Accordingly, the scenario identifier module is configured to detect this scenario and to extract a set of scenario parameters indicative of this scenario. For this example situation the set of scenario parameter may be an initial position of the external vehicle relative to the ego-vehicle 1, an initial speed of the vehicle, a trajectory of the external vehicle, a road geometry, road conditions, weather conditions, and so forth. Moreover, the scenario identifier module may further be operatively connected to a memory device acting as a buffer that records and stores a set of states over time based on the obtained sensor data. Accordingly, the scenario identifier module may be configured to use the stored set of states in order to "detect" the scenarios and generate the scenario parameters. In other words, the buffer is used as input to the scenario identifier module in order to identify the entire evolution of a scenario once the whole scenario has been "experienced". In other words, the buffer comprising the "current" states over time are post-processed after the entire scenario/event has evolved. Thus, the scenario identifier module may be configured to generate the scenario parameters after the actual scenario has occurred in order to identify the actual scenario once it has happened. Thus, by having a buffer of the "observations" in the surrounding environment, the scenario identifier module may be configured to analyse the buffer during operation of the vehicle in order to classify and quantify the scenarios.

In the present context, the term "scenario" refers to a situation or an event or a series of events or situations. The term scenario may relate to any traffic situation, the term scenario is not exclusive to unexpected or unusual traffic situations. In some examples a scenario may be a series of states relating to becoming overtaken by a vehicle. In some examples a scenario may be a series of states relating to overtaking another vehicle. In some examples a scenario may be a series of states relating being cut off by another vehicle. In some examples a scenario may be a series of states relating to another vehicle breaking aggressively. In some examples a scenario may a state of stationary vehicles in all lanes. In more detail, a scenario may be understood as scenario is a description of the temporal development between several scenes in a sequence of scenes where a scene refers to a snapshot of the environment including the scenery (e.g. rain, fog, pot holes, etc.), dynamic elements, and all actor and observer self-representations, and the relationships between those entities.

Scenarios are also discussed and defined in S. Ulbrich, T. Menzel, A. Reschka, F. Schuldt and M. Maurer, "Defining and Substantiating the Terms Scene, Situation, and Scenario for Automated Driving," 2015 IEEE 18th International Conference on Intelligent Transportation Systems, Las Palmas, 2015, pp. 982-988, doi: 10.1109/ITSC.2015.164, the content of which is hereby incorporated in its entirety, and which explains which different parts or layers of the scene around the vehicle contribute to a scenario. Further information on scenarios can be found in Hendrik Weber, Julian Bock, Jens Klimke, Christian Roesener, Johannes Hiller, Robert Krajewski, Adrian Zlocki & Lutz Eckstein (2019) A framework for definition of logical scenarios for safety assurance of automated driving, Traffic Injury Prevention, 20:sup1, S65-S70, DOI: 10.1080/15389588.2019.1630827, see in particular, FIG. 1, the content of which is hereby incorporated in its entirety. The paper entitled "StreetWise: scenario-based safety validation of connected automated driving by Hala Elrofai, Jan-Pieter Paardekooper, Erwin de Gelder, Sytze Kalisvaart, and Olaf Op den Camp, dated July 218, and deposited on the TNO Innovation for Life repository of the University of Delft, downloadable on 16 Nov. 2020 from https://repository.tudelft.nl/view/tno/uuid:2b155e03-5c51-4c9f-8908-3fa4c34b3897 also describes examples of scenarios and the contents of this paper are also incorporated herein in its entirety.

Some of the disclosed embodiments allow remote monitoring by a fleet server of the new experiences one or more vehicles 1 encounter. This may, in some embodiments, eventually lead to a safer ADS to be provided if necessary, based on the new ADS experiences which each vehicle shares with the remote fleet server.

Some embodiments use the autoencoder's ability to exaggerate data anomalies to detect new experiences with greater sensitivity allowing smaller changes to the behavioural situations that were captured in the original ADS configuration and/or development data (which was used as the autoencoder's original training data) to be detected. The disclosed embodiments advantageously can enable ADS model(s) to have their safe performance monitored and their performance checked more accurately as new experiences are encountered by vehicles being driven around on public roads.

In some embodiments, the new experience and/or autoencoder updates data can be obtained by crowd sourcing from a plurality of ADS vehicles in a fleet, so that even when one ADS vehicle encounters a rare or unusual situation, this can be shared with the fleet server and the autoencoders of the other vehicles can be updated to prevent double reporting of the same experience. In some embodiments, the ADS operations are changed so that the change of risk associated with the now known rare event/scenario is acceptable, if, for example, it wasn't acceptable before. by changing an ADS operation in this way, if a vehicle encounters a rare and potentially dangerous situation comprising the same or a similar experience later on, it will do so with an ADS in a more favourable operational state for handling that experience safely than might otherwise be the case.

As mentioned, it is not possible or at least not practically feasible to send raw sensor data due to the huge amounts of information which would need to be processed by the ADS. Neither is it viable to send even intermediate data representations of the world, e.g., object-level data, if the entire drives are to be transmitted for offline processing in a "cloud".

Accordingly, in some embodiments the sensor data each vehicle transmits to each remote server as an update only comprise behavioural data associated with a new or rare experience which was detected as an anomaly or unrecognised situation or new scenario. The identified scenarios are preferably captured or at least transmitted to the fleet server 12 in the same format as the ones used to configure and/or develop the ADS model. The scenarios can be used then for safety assurance and potentially even to update the operational design domain, ODD, of the central ADS. This reduces the need for immense amounts of bandwidth and storage capacity to build and maintain the framework used for safety assurance of the ADS which may also make this a more cost-effective option for the data transfers between the vehicle(s) and the server 12.

FIG. 2 shows an example of a vehicle 1 which may form a vehicle 1a, 1b, 1c in the fleet shown in FIG. 1. For example, a vehicle 1 may comprise an ADS, 10, a machine-learning classification system such as an autoencoder module 16, a perception system 3 comprising at least one sensor 3a,3b,3c configured to monitor a surrounding environment of the vehicle 1, a localization system 2 configured to monitor a geographical map position of the vehicle 1, and a control system 5 for managing and/or monitoring new experiences encountered by the ADS 10 of the vehicle 1 using any of the disclosed embodiments of method 100.

In the example of FIG. 2, the control system 5 for managing and/or monitoring experiences encountered by an Automated Driving System, ADS, 10 of the vehicle 1 includes an anomalous behaviour detection system, ABDS, 11. In the illustrated embodiment, the ABDS 11 comprises an autoencoder 16 training using the experience library used to configure and/or develop the vehicle's on-board ADS 10. The ABDS 11 also comprises a new experience data library providing training data 18 which can be used to retrain the autoencoder 16 from time to time as new experiences are encountered and/or as new experience updates are received from the fleet server 12. Once trained, the autoencoder 16 receives as input sensed behavioural data 20 from the sensors 3a,3b,3c used by ADS 10 and other data provided by control system 5 for the ADS 10 as the vehicle is driven around.

Some of the disclosed embodiments use scenario data and in these embodiments, the ADS of each ground vehicle 1 and the central ADS model of the back-end server 12 of Figure includes a scenario identifier module which is not shown in FIG. 2. The scenario identifier module of each ground vehicle 1 is configured to monitor scenarios in a surrounding environment of each corresponding ground vehicle 1. In these embodiments, the global ADS of the back-end server 12 of FIG. 3 includes a global autoencoder which is trained using scenario data analogous to it being set up to operate on behavioural data directly.

Also shown in FIG. 2 are the global ADS model 19, the global data library of new ADS experiences 17 and the global autoencoder model 15 of fleet server 12.

The embodiment of the ground vehicle 1 shown in FIG. 2 includes perception system 3 and a localization system 2. Perception system 3 comprises a system configured to acquire raw sensor data from on-board sensors 3a,3b,3c, which is converted into scene understanding by the ADS. The localization system 2 is configured to monitor a geographical position and heading of the vehicle, and may take the form of a Global Navigation Satellite System (GNSS), such as a GPS. However, the localization system may alternatively be realized as a Real Time Kinematics (RTK) GPS or a differential GPS in order to improve accuracy.

The perception system 3 architecture may comprise one or more electronic control modules and/or nodes of the ground vehicle 1 which are configured to interpret information received from a sensor system 3a,3b,3c of the vehicle 1 whilst the ground vehicle 1. In some embodiments, perception system 3 relies on and obtain inputs from multiple data sources, such as automotive imaging, image processing, computer vision, and/or in-car networking, etc., in combination with sensory information. The sensory information may for instance be derived from a sensor system comprising one or more detecting sensors 3a-c comprised in or otherwise provided on-board the vehicle 1. In some embodiments, the detecting sensors 3a-c form a sensor system which provides 360 degree or nearly 360 degree coverage of all of the surrounding environment of the vehicle 1. The inputs to the perception system 3 can be used to identify and/or track objects as the vehicle is driven, such as, for example, e.g. obstacles, vehicle lanes, relevant signage, appropriate navigation paths etc., and may also form experience data, such as that used to configure the on-board ADS 10 (also shown in FIG. 2). Any new experiences encountered by the ADS 10 of the vehicle will be reflected in the sensory information.

The control system 5 comprises one or more processors 6, a memory 7, a sensor interface 8 and a communication interface 9. The processor(s) 6 may also be referred to as a processor circuitry 6 or control circuit 6 or control circuitry 6. The control circuit 6 is configured to execute instructions stored in the memory 7 to perform any of the disclosed methods for managing and/or monitoring an ADS of the vehicle 1 according to any one of the embodiments disclosed herein. The memory 7 of the control system 5 comprises one or more (non-transitory) computer-readable storage mediums, for storing computer-executable instructions, which, when executed by one or more computer processors 6, for example, can cause the computer processors 6 to perform the disclosed on-board vehicle methods and to implement the disclosed functionality and techniques described herein which take place on-board the vehicle 1.

In some embodiments, memory 7 includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The memory 7 is capable of storing computer code components and/or modules that may be used by some embodiments of the ADS and/or autoencoder models disclosed here.

The processor control circuitry 6 is configured to process the data obtained from the sensor system comprising information about a surrounding environment of the ground vehicle 1. In some embodiments the ADS 10 is configured using scenario data and/or the autoencoder model is trained and receives data representing various scenarios. For these embodiments, the processor control circuitry 6 is configured to detect, by means of a scenario identifier module, a scenario in the surrounding environment based on at least the sensor data. By extracting a set of scenario parameters indicative of the detected scenario and feeding this into the autoencoder model, the autoencoder can then confirm if the detected scenario is a scenario that was included in the data used to configure the autoencoder or if the input to the autoencoder contains any anomalous behaviour(s) which might modify the scenario sufficiently to be considered to form a new scenario etc. This allows the autoencoder to detect anomalous parameters of scenarios that are still within the scenario framework (e.g. a cut-in or overtake).

In some embodiments, when an anomalous scenario has been detected by the ADS using the autoencoder 16 of the on-board ABDS 11, the processor control circuitry 6 is configured to transmit in step 110, to the back-end server 12 (or remote server or entity providing equivalent functionality to the back-end server 12 shown in FIG. 1) at least one of the following data sets:

one or more new experiences, each comprising an extracted set of scenario parameters indicative of any scenarios determined to include anomalous behaviour and which may form a new scenario or a very rarely experienced scenario;

an update to the local autoencoder algorithm, if this has been retrained using one or more new experiences; and a locally updated set of scenario model parameters for the local scenario identifier module.

In this example, anomalous behaviour is represented by a scenario which, when input into the autoencoder, resulted in an unacceptable reconstruction error. For example, if the anomalous behaviour input to the autoencoder represents a vehicle's path (which may be the path of the ego vehicle or another vehicle in the vicinity of the ego-vehicle), then reconstruction of that vehicle's path which the autoencoder outputs will be above an error threshold if the autoencoder was not trained on data which included such a path in such a scenario, meaning that the scenario includes an anomaly.

In some embodiments, the processor control circuitry 6 is instead configured to detect, by means of a buffer of data comprising object-level data sensor data and sensor data representing road and environmental conditions, anomalous behaviour in the surrounding environment using an autoencoder which has been trained using similar amounts and types of buffered data. In some of the embodiments which use a buffer trained autoencoder, when anomalous behaviour is detected, the set of scenario parameters indicative of the detected scenario is determined by circuitry implementing the scenario identifier module of the ADS. The processor control circuitry 6 is then configured to locally update a set of model parameters of the scenario model based on the extracted set of behavioural parameters which represent the anomalous behaviour detected by the autoencoder. In this manner, some embodiments of the processor control circuitry 6 are configured to perform steps in a method 100c such as FIG. 3C of the accompanying drawings shows schematically. FIG. 3C is described in more detail later below.

Accordingly in some embodiments, the anomalous behaviour is detected as anomalous scenario data. In some other embodiments, the anomalous behaviour is detected as anomalous buffered data, and subsequently anomalous behaviour parameters are determined from the buffer. In embodiments where anomalous scenario or new scenario data representing detected anomalous behaviour is determined by the ADS, the locally updated scenario parameters for the anomalous behaviour are transmitted by the processor control circuitry 6 to the back-end server 12 (or remote server or entity providing equivalent functionality to the back-end server 12 shown in FIG. 1).

In this manner, some embodiments of the processor control circuitry 6 are configured to perform steps in a method 100*b* such as FIG. 3B of the accompanying drawings shows schematically where each ground vehicle 1*a*, 1*b*, 1*c*, is configured to transmit at least one of the following types of data sets to a back-end server 12: an extracted set of scenario parameters indicative of the detected scenario, and/or the locally updated set of scenario model parameters and a number of samples used to generate the locally updated model parameters. FIG. 3B is described in more detail later below.

In some examples, however, the anomalous behaviour sent by the processor control circuitry 6 to the back-end sever 12 comprises the raw buffer of data associated with anomalous behaviour. The raw buffer data may in some instances be first processed on the ground vehicle, and in some examples in provided instead of or in addition to the scenario level data. In this manner, some embodiments of the processor control circuitry 6 are configured to perform steps in a method 100*a* such as FIG. 3A of the accompanying drawings shows schematically. FIG. 3A is described in more detail later below.

Referring again to FIG. 2, ADS 10 and/or the ABDS (the anomalous behavioural detection system) may each be provided with separate, or may share with each other, or share with the control system 5 of the ground vehicle, one or more components such as, but not limited to, a processor, memory, and data (for example, sensor or communications) interfaces to receive data and control signals.

The processor(s) 6 may in some embodiments be shared by the control system 5 and the ADS 10 and/or the ABDS 11 associated with the ADS 10. The processor(s) 6 may be or may include any number of hardware components for conducting data or signal processing or for executing computer code stored in memory 7. The control system 5 and the ADS 10, and ABDS 11 may use dedicated or shared memory 7. Memory 7 may be one or more devices for storing data and/or computer code for completing or facilitating the various methods described in the present description.

The memory 7 may in some embodiments be shared by the control system 5 and the ADS 10 and/or the ABDS associated with the ADS 10. The memory 7 may include volatile memory or non-volatile memory. The memory 7 may include database components, object code components, script components, or any other type of information structure for supporting the various activities of the present description. In some embodiments, any distributed or local memory device may be utilized with the systems and methods of this description. In some embodiments the memory 7 is communicably connected to the processor 6, for example, via a circuit or any other wired, wireless, or network connection, and includes computer code for executing one or more processes described herein.

A sensor interface 8 may in some embodiments be shared by the control system 5 and the ADS 10 and/or the ABDS 11 associated with the ADS 10. The sensor interface 8 may also provide the possibility to acquire sensor data directly or via dedicated sensor control circuitry 3 in the vehicle 1. The communication/antenna interface 9 of the ground vehicle 1 may further provide the possibility to send output to a remote location, for example, to a remote operator or control centre, such as the fleet server 12, by means of the antenna 4 via an external network 14. Moreover, some sensors in the vehicle 1 may communicate with the control system 6 using a local network setup, such as CAN bus, I2C, Ethernet, optical fibres, and so on. The communication interface 9 may be arranged to communicate with other control functions of the vehicle 1 and may thus be seen as control interface also; however, a separate control interface (not shown) may be provided. Local communication within the vehicle 1 may also be of a wireless type with protocols such as WiFi, LoRa, Zigbee, Bluetooth, or similar mid/short range technologies.

In some embodiments, the memory 7 of the ground vehicle 1 stores the autoencoder model algorithm and also stores experience updates for the autoencoder algorithm found by that ground vehicle. It may also store experience updates received from a remote server 12 and/or updates to the local autoencoder algorithm. Examples of memory 7 include general embodiment comprising a computer-accessible medium which may more particularly comprise any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In FIG. 1, each vehicle 1*a*, 1*b*, 1*c* in the fleet of vehicles managed by the fleet server 12 individually performs an embodiment of method 100 to monitor new experiences encountered by the ADS which uses an on-board autoencoder 16 to identify any new experiences in the behavioural data processed by its on-board ADS. The new experiences can be sent back to the fleet sever 12 so that other vehicles in the fleet can also have their local library of experiences for their ADS systems updated and also the autoencoder models of the other vehicles in the fleet can also be updated. The method 100 may comprise a method such as method 100*a*, *b*,*c* shown FIG. 3A,B,C or any other example embodiments of method 100 disclosed herein. In some embodiments, the method also enables the operating margins of the local ADS 10 to be updated without waiting for an update for the operating margins to be received from the fleet server 12. In both cases, however, the ADS can be updated in an efficient and timely manner. FIGS. 3A to 3B show schematically some examples of more detailed embodiments of the method 100 which each vehicles 1*a*, 1*b*, 1*c* performs.

In FIG. 3A, method 100 comprises method 100*a*, which may, for example, be performed by the control system 5 of vehicle 1*a*, 1*b*, 1*c*. In the example embodiment illustrated in FIG. 3A, the obtaining step 102 shown in FIG. 1 comprises obtaining a data stream in step 300 comprising information about a surrounding environment of that vehicle 1. A plurality of behavioural data segments are then formed from the data stream, for example, by buffering the data stream, to determine in step 302 a behavioural data segment for input to the autoencoder 16. In some embodiments, the behavioural data segment comprises sensed object level behaviour data and/or environmental data such as situational data, and weather or road conditions etc. The determined behavioural input data segment is then input in step 304 into the autoencoder 16.

In FIG. 3A, the detecting anomalous behaviour step 104 of FIG. 1 comprises determining in step 306 a reconstruction error for the input behavioural data by comparing the output of the autoencoder 16 for each behaviour data segment input to the input behavioural data segment. This is also shown schematically in FIG. 5A and FIG. 6 described in more detail later below.

An input behavioural data segment which represents a new or previously not recognized as new experience in the sensed data stream generated by the vehicle will be detectable in step 308 as representing anomalous behaviour 22 as its reconstruction error will be high. For example, it may exceed a threshold value above which the input is considered to represent a situation or experience not previously encountered as it was included in the training data for the autoencoder 16. Parameters representing the anomalous situation can then be extracted 106, 310 from the input data and stored appropriately in memory on the ego vehicle 1a, 1b, 1c.

In the example embodiment shown in FIG. 3A, but not necessarily in all embodiments, the anomalous behavioural data found using the autoencoder 16 is used to locally update a local library of new experiences 18 comprising experiences not previously used to configure or develop the on-board ADS 10 in step 312a. In some embodiments, and as shown in FIG. 3A, a step of locally updating the autoencoder model 16 in step 314a can also be performed. These steps mean that the local autoencoder 16 model on vehicle 1a, for example, if this was the vehicle which encountered the new experience, is different (for example, as in more up to date) than the global autoencoder models 15 and are also different at this point from any local copies of the autoencoder models 16 on other vehicles 1b, 1c in the fleet. Whilst this prevents a new update from reoccurring locally if that new experience is re-encountered later before a global update is received, in some embodiments, the local autoencoder models 16 are configured to only be updated responsive to an update being received from the fleet server 12.

In some embodiments, the local updates occur responsive to triggering event, for example, such as an update buffer storing newly detected anomalous situations becoming full. The triggering event could comprise a local buffer coming full, or a certain amount of time elapsing since a last update, or a certain number of new experiences occurring in a given period of time. The same or a different triggering event may also trigger the vehicle transmitting, in step 110, 316a of FIG. 3A, the updated behavioural data for the new experience and/or the updated autoencoder model to the fleet server 12, for example, via a wireless data communications link 111 with fleet server 12 over an access network 14 such as, for example, a radio access network. An example of a trigger for the transmitting in step 316a comprises the vehicle being parked in or moving into an area where the communications network meets a minimum transfer speed requirement.

In some embodiments, the method 100 comprises obtaining 102 the data stream by obtaining 300 at least a stream of sensed object-level data comprising information about a surrounding environment of the vehicle 1, and detecting 104 anomalous behavioural data in the data stream by: inputting 304, 320 behavioural data segments determined 302, 318 from the stream of sensed object-level data into the autoencoder 16, determining 306, 322 a reconstruction error for the input behavioural data using the autoencoder 16, and, based on the determined 306 reconstruction error meeting a threshold condition, determining 308, 324 the input behavioural data comprises anomalous behavioural data. As an example, the threshold condition may require the determination of the reconstruction error exceeding a threshold for known behavioural data. In some embodiments, a time-segment of behavioural data derived from the data stream forms the input behavioural data 20 which is input into the autoencoder 10, wherein the input behavioural data 2 comprises at least sensed object-level data and data representing one or more environmental or situational conditions for an environment surrounding the vehicle 1. For example, a time-segment of behavioural data input into the buffer may comprise a buffer of data from the data stream.

In some embodiments, the method 100 comprises method 100b shown in FIG. 3B in which an additional step comprises identifying 311 a new scenario comprising the extracted 106,310 behavioural data and the transmitting 110 comprises transmitting 316b at least the new ADS scenario data to the remote server 12. These follow steps 300 to 310 which are the same as those described above for method 100a. In the embodiment of FIG. 3B however the behavioural data representing the new experience encountered by the ADS 10 comprises sensed scenario data identified by the vehicle 1 and the ADS uses scenario data, for example, such as that described in Gyllenhammar, M., Zandén, C., and Törngren, M., "Defining Fundamental Vehicle Actions for the Development of Automated Driving Systems," SAE Technical Paper 2020-01-0712, 2020 or one of the other references cited herein.

In the method of FIG. 3B, although the ADS 10 is using scenario data, the autoencoder 16 is still trained using buffers of sensed object-level data and data indicative of the surrounding environmental and situational conditions. In this embodiment, method 100b further comprises identifying 311 a new scenario comprising the extracted 310 behavioural data and the transmitting 110 comprises transmitting 316b at least the new ADS scenario data to the remote server 12. In this embodiment, the extracted anomalous behaviour is used to identify a new scenario in step 311. Optionally, the local library of scenarios may be updated (step 312b) and then analysed and used to update, for example, the operating margins of the local ADS. Optionally, the autoencoder model 16 may also be updated by training it with the data from the input scenario, i.e. the object-level data, in step 314a in a similar manner to the way the autoencoder of method 100a shown in FIG. 3A is updated.

The transmitted update data step 316b of method 100c accordingly may provide scenario data to update a scenario library used to configure the global ADS of the fleet server 12 and also provide either object-level data to update the training data used by the global autoencoder or an updated autoencoder algorithm to the fleet server 12.

FIG. 3C shows an alternative embodiment of method 100, method 100c which may be implemented if the autoencoder is trained on scenario data used to configure and/or develop the ADS. In method 100c after obtaining the data stream in step 300, the method further comprises the input behavioural data 20 being processed to determine if it comprises behavioural data representing an identified scenario in step 318. The scenarios are identified by a scenario identifier used by the ADS 10 of the vehicle 1. In this embodiment, the method 100c is similar to methods 100a, 100b, but as the autoencoder 16 is trained using a data library of experiences comprising behavioural scenario data, the input behavioural data segments each represent a behavioural scenario. The method 100 differs from method 100a, 100b as the inputting behavioural data step (step 304 in FIGS. 3A and 3B) comprises inputting in step 320 behavioural data segments representing identified in step 318 as behavioural scenarios into the autoencoder 16. In other words, the behavioural data segments which are determined in step 302 in methods 100a, 100b are identified in step 318 of method 100c as behavioural data in the scenarios identified in the behavioural data stream. The determining step 306, 322 of methods 100a, 100b of a reconstruction error for the input behavioural data comprises in method 100c determining in step 322 a reconstruction error for the behavioural data of each input scenario using the autoencoder 16. The determining step 308 in methods 100a, 100b that the input behavioural data comprises anomalous behavioural data comprises determining in step 324 of method 100c of the input scenario is a scenario which includes anomalous behavioural data. The extracting step 106, 110 of methods 100a,b shown in FIG. 1 behavioural data representing the new experience from the data stream comprises in method 100c extracting in step 326 parameters representing the input scenario.

FIG. 3C shows schematically a sequence of steps performed in an embodiment of method 100c where the autoencoder 16 is trained using behavioural data extracted from a data library of experiences comprising behavioural scenario data. The determining 302, 318 behavioural data segments for input into the autoencoder step comprises identifying 318 behavioural scenarios in the behavioural data stream. The inputting 304, 320 behavioural data segments step comprises inputting 320 data representing identified behavioural scenarios into the scenario trained autoencoder 16. The determining 306, 322 a reconstruction error for the input behavioural data step comprises determining 322 a reconstruction error for the input scenario data using the autoencoder 16. The determining 308, 324 the input behavioural data comprises anomalous behavioural data step comprises determining 324 the input scenario is a scenario which includes anomalous behavioural data. The extracting 106 behavioural data representing the new experience from the data stream step comprises extracting 326 parameters representing the input scenario.

In some embodiments of the distributed system for monitoring experiences encountered by an ADS shown in FIG. 1, each vehicle 1a, 1b, 1c performs an embodiment of one of method 100, 100a, or 100b if autoencoder uses object-level data to find new experiences or 100c if the autoencoder uses scenario level data, in which the anomalous behaviour extracted in step 106, 310, 326, for example, the object-level data or scenario parameters for the new experience the autoencoder has detected, are stored on the vehicle 1 in a data library for new experiences the vehicle has encountered, in other words, the new experience library is updated as shown as step 312a, 312b in methods 100a, 100b, and also method 100c where the parameters for the new scenario may be used to update a new scenario or experience data library in step 312. This new experience library is then transmitted in step 100a, 316a, 316b as shown in methods 100a, b, c from time to time to the fleet server 12. The new experience data may also in some embodiments be used from time to time to retrain the on-board autoencoder, so that repeated encounters of the same experience are not repeatedly reported to the server. The local retraining of the autoencoder model is shown in FIGS. 3A, 3B as update autoencoder step 314a of methods 100a,b and as update encoder step 314b of method 100c in FIG. 3C.

The fleet server 12 shown in FIG. 1 may in some embodiments be a stand-alone server apparatus or platform by in some embodiments is provided as a distributed platform or cloud based platform. In FIG. 1, each vehicle 1a, 1b, 1c, may use the same type or a different type of wireless link to communicate with other vehicles 1a, 1b, 1c in the vicinity of the vehicle or with local infrastructure elements or with the remote server 12. For example, cellular or radio communication technologies may be used for long range communication such as to fleet server 12 over a radio or cellular access network 14. In some examples, a cellular communication technology which has low latency may also be used for communication between vehicles, vehicle to vehicle (V2V), and/or vehicle to infrastructure, V2X. Examples of cellular radio technologies are GSM, GPRS, EDGE, LTE, 5G, 5G NR, 6G, and so on, also including future cellular solutions. However, in some solutions mid to short range communication technologies are used such as Wireless Local Area (LAN), e.g. IEEE 802.11 based solutions. The ETSI standards body is working on cellular standards for vehicle communication and for instance 5G is considered as a suitable solution due to the low latency and efficient handling of high bandwidths and communication channels (ultra-low latency technology).

The input to the autoencoder in method 100b is based on the object-level sensed data, however, where anomalous behavioural data is indicated in the output based on the reconstruction error of the autoencoder for that data, this can be used to form a new scenario. Note that in method 100b, the local autoencoder finds new scenarios, meaning that this may be provided to the fleet server 12 in the form of new scenario data. Alternatively, however, the new object-level experience data 312a,b can be send to the fleet server 12 which can then process the data independence on similarities to new experiences report by other vehicles to form a new scenario. In some embodiments, each vehicle 1a,1b,1c may be only intermittently connected to the fleet server 12. In some embodiments, fleet server 12 can send requests to each vehicle 1a,1b,1c to provide update data alternatively one or or more or all of the vehicles 1a, 1b, 1c can push update data to the fleet server 12.

In some embodiments of the methods 100, 100a, 100b, 100c, the transmitting 110, 316, 316b step also transmits the updated algorithm representing the retrained autoencoder model and/or one or parameters for the retrained autoencoder model to the remote server 12.

As shown in FIG. 1, in some embodiments, each vehicle's control system 5 also receives from time to time from the fleet server 12 updates. For example, one or more of the following updates is received from fleet server 12 by each vehicle in the fleet: an experience update comprising either an update for the on-board data library of anomalous experiences for training the autoencoder; or an autoencoder update comprising an updated autoencoder algorithm.

In one example embodiment of the system shown in FIG. 1, the control system 5 shown in FIG. 2 for vehicle 1 is part of each vehicle 1a, 1b, 1c in the fleet shown in FIG. 1. Control system 5 provides a system for monitoring experiences of an Automated Driving System, ADS, 10 of a vehicle which uses an autoencoder 16 configured to identify new experiences encountered by the ADS. The autoencoder is configured to output reconstructions of any data which was input in a way which will exaggerate the differences between the input and output of data not included in the data set on which the autoencoder was trained. The autoencoder used by the control system forms part of the anomalous behavioural detection system 11 described herein. The autoencoder 16 is trained using the behavioural data indicating experiences known (as in used to configure or develop or otherwise analysed) by the ADS 10. Control system 5 comprises a memory including suitable machine executable instructions and one or more processor(s) or processor circuitry for controlling the ADS and for performing at least one of the disclosed embodiments of method 100 such as method 100*a*, 100*b*, 100*c*.

For example, in one embodiment, the control system 5 is configured to perform at least the steps of: obtaining in step 102 sensor data comprising information about a surrounding environment of the vehicle 1 and detecting in step 104 anomalous output from an autoencoder 16 trained on data the ADS 10 has previously encountered. In this manner, new experiences comprising new situations, behaviours, and environmental conditions encountered by the vehicle as sensed by the sensors 3*a,b,c* which provide data to ADS 10 will be quickly capable of being identified and distinguished from experiences that ADS 10 has not previous encountered. The control system 5 then extracts (step 106) behavioural parameters for the anomalous behaviour and uses these to update (step 108) an on-board data library of new ADS experiences encountered by the on-board ADS which can also function as a training library for retraining the autoencoder model so that the same new experience is not repeatedly reported to the fleet server 12. The extracted parameters which are used to update the local training data library for the local (as in vehicle-side) autoencoder and/or the algorithm of the vehicle-side autoencoder in step 108 are later transmitted to the fleet server 12 in step 110. The behavioural data which was generated as a result of the vehicle encountering the new experience, i.e. encountering the new situations, behaviours and environmental conditions which was found to generate an anomalous result by the autoencoder is separately stored by the control system 10 so that this data can be transmitted at appropriate intervals of time and/or when suitable connections are available to the fleet server 12 for use in a global update to the data library of new experiences of the fleet ADS system.

In some embodiments, the timing of when each vehicle sends its experience updates to the fleet server 12 is configured by the fleet server. For example, the fleet server may request and/or each vehicle may be configured, to provide an update responsive to a triggering event in some embodiments of the invention. Examples of a triggering event the remote server may configure include, for example, a local memory storing update data reaching a certain level or percentage of fullness, or a certain period of time elapsing, or a scheduled time-slot occurring so that updates from a fleet comprising a large number of vehicles 1*a*, 1*b*, 1*c* can be suitably managed.

In some embodiments, each vehicle 1*a*, 1*b*, 1*c* accordingly includes a system 5 for monitoring new experiences encountered by its on-board ADS 10 using an autoencoder 16 configured to identify new experiences encountered by the ADS and distinguish new experiences from experiences known by the ADS. The autoencoder can be trained/retrained using behavioural data for the new experiences as these become known.

In some embodiments of the control system 5 on each vehicle for monitoring experiences encountered by the Automated Driving System, ADS, 10 of the vehicle, the system is configured to monitor the experiences encountered by the ADS 10 by identifying anomalous behaviour of that vehicle. The control system 5 comprises a memory including machine readable instructions and one or more processors and/or processor or control circuitry configured to cause the control system to: obtain 102 behavioural data comprising information about a surrounding environment of the vehicle 1, detect 104, by means of the autoencoder, anomalous behaviour in the surrounding environment of the vehicle based on the obtained behavioural data and a reconstruction error representing the anomalous behaviour, extract 106 a set of parameters indicative of the detected anomalous behaviour, update 108 a data library of new ADS experiences which forms an autoencoder training library to include the detected anomalous behaviour, update the autoencoder model algorithm using the updated autoencoder training library, and transmit 110, to a remote server comprising a fleet ADS for a plurality of vehicles 1, such as fleet server 12, data representing the new ADS experience data library and/or data representing an updated autoencoder model algorithm and/or some other data found by the autoencoder to be anomalous behavioural data so as to update the library of experiences used to configure the central ADS of the fleet server 12.

In some embodiments, the system 5 is provided on a vehicle 1 where the vehicle 1 comprises: an ADS 10, an autoencoder module 16 configured to determine anomalous behaviours in the surrounding environment of the vehicle 1, the autoencoder 16 being configured to identify new experiences encountered by the ADS 10 based on its training using behavioural data for experiences known by the ADS 10; a perception system 3 comprising at least one sensor 3*a*,3*b*,3*c* configured to monitor a surrounding environment of the vehicle 1 and generate sensed behavioural data for used by any of the disclosed embodiments of methods 100, 100*a*, 100*b*, 100*c*; a localization system 2 configured to monitor a geographical map position of the vehicle 1.

In some embodiments of the method 100, the data received by the fleet server 12 from each vehicle comprises anomalous behaviour data either in the form of sensed data or behavioural parameters representing sensed data, or in the form of scenario data, for example, behavioural parameters representing scenario data. Sensed data may comprise object-level sensed by the perception system 3 of the vehicle 1 and any other sensed data from the environment around a ground-vehicle, as weather (e.g. fog, frost, ice), road-conditions, temperature, humidity, light levels, etc.). In embodiments where scenario data is used by each vehicle and by the fleet server 12, the ADS includes a scenario identifier module to recognize scenarios as they are generated as in the ego vehicle, for example, as the vehicle is being driven. Various different types of scenarios are detectable by means of a scenario identifier module of the ADS 10 of the vehicle 1*a* in some embodiments, for example, two embodiments of a car-following scenario are shown in FIGS. 8A and 8B, where each scenario includes a vehicle 1*c* braking in front of vehicle 1*b* and as a result the vehicle 1*b* cuts-out from the path of vehicle 1*a*. The scenario identifier module of the ADS is configured to detect and extract a set of scenario parameters indicative of the detected scenario, i.e. to quantify the scenario. For example, the scenario parameters may comprise an "initial" position of the ego vehicle 1*a*, a trajectory of the ego vehicle 1*a* (indicated by the arrows extending from the front of each vehicle 1*a*-1*c* in FIGS. 8A and 8B), time at which the target vehicle 1*b* crosses the lane marking, current traffic rules, positions of another vehicle(s) 1*b*, 1*c* relative to the ego vehicle 1*a*, geographical position of vehicle 1*b*, signage in the surrounding environment, road surface texture, weather parameters, and so forth.

Each update comprising behavioural data (either at the object-level or at the scenario level) which is received by fleet server 12 from each vehicle 1 is then used to update in step 206 a data library of new experiences 17 which can then be analysed and/or used to retrain the global autoencoder model. Alternatively, if the local autoencoder has been already retrained by the vehicle 1a, the vehicle 1a may send instead data representing an update to the autoencoder algorithm to the fleet server 12.

As the central or global data library of new ADS experiences 17 can be used as training data for the central autoencoder 15, updates sent in step 110, 316a,b to the global data library of new ADS experiences 17 in some embodiments can trigger retraining the global autoencoder 15. In some embodiments, data is sent which can instead or in addition be used to update a central scenario identifier model used by the global ADS 19, in which case, the updates to the scenario identifier model can then be pushed out to each vehicle 1a, 1b, 1c in the fleet together with the other data update.

In some embodiments the fleet server 12 may receive instead or in addition to behavioural data, update data in step 208 for its autoencoder. This may comprise an updated autoencoder algorithm, which it may also use to update its central autoencoder algorithm. The updated data library of new experiences for the autoencoders and/or the scenario identifiers and/or the updated autoencoder model data is then transmitted in step 212 back to the vehicles 1 in the fleet. In some embodiments, such as that of FIG. 3B, object-level data is used by the autoencoder which can be either locally used to identify a new scenario and/or the object-level data the autoencoder found to be anomalous can be sent to the fleet server 12 to be processed and if found to be a new scenario by fleet server 12, this can be used to update its central scenario models. The updates to the central scenario model may then be provided to any of the vehicles 1b, 1c in the fleet which include scenario identification modules.

The global model updates provided by fleet server 12 to the vehicles in the fleet enable an ADS 10 on-board each vehicle 1a, 1b, 1c receiving a model update to update its local data library of new experiences and/or autoencoder model and/or scenario identification model (or other behavioural recognition models which may be used by the ADS). The transmitted updates may be pushed by the fleet server to each vehicle in some embodiments and/or each vehicle may send a request for updates first to each server. The update data may be stored by the fleet server and transmitted only responsive to a triggering event occurring, for example, responsive to a certain amount of time elapsing or a predetermined number of updates having been received.

In some embodiments, the fleet server 12 shown in FIG. 1 comprises a system for remotely monitoring experiences encountered by an Automated Driving System, ADS, for a plurality of vehicles 1 which uses scenario data. Each vehicle includes an ADS 10 associated with an updateable autoencoder 16 configured to identify anomalous behaviour of that vehicle. The system comprises a memory and control circuitry configured to perform steps of any of the sever-side methods disclosed herein, for example, the following steps: obtain (step 202) data from each of the plurality of vehicles 1. The obtained data represents anomalous behaviour detected by an autoencoder 16 of a vehicle 1 and/or comprises data representing updated autoencoder algorithm for the autoencoder 16 of that vehicle 1. The received update data is processed (step 210) to update one or both of: a global training library of scenarios for each autoencoder of a vehicle 1 based on the obtained scenario data; a global autoencoder algorithm for each autoencoder of a vehicle 1 based on the obtained data; and transmit 212 update data to the plurality of vehicles 1a, 1b, 1c, wherein the transmitted update data comprises at least one of: an updated scenario library for that vehicle's ADS 10 and an updated algorithm for the on-board scenario trained autoencoder 16 of that vehicle.

FIG. 4 shows an example embodiment of a method 200 which some embodiments of the fleet server 12 of the fleet server system shown in FIG. 1 and also in FIG. 2 perform from time to time responsive to receiving in step 202 and storing in step 208 updates from fleet vehicles when processing in step 210 the updates as shown in FIG. 1. In FIG. 4, the additional processing comprises updating in step 210a a global data library of new ADS experiences 19 and, from time to time, retraining the global autoencoder model 15. Each update in step 210a to the library of new experiences comprises anomalous behavioural data determined to represent new or rare experience(s) encountered by one or more vehicles in the fleet. The method shown in FIG. 4 also shows in more detail how in some embodiments, the updated ADS experience data library is analysed in step 210b. The analysis may be performed for various purposes, for example, to obtain a statistical count of the number of new experiences associated with a particular geographic region, or for some other purpose. If the analysis of step 210b indicates the updated behavioural data meets one or more conditions to update the operational margins of the ADS, for example, these are also updated in step 210c in some embodiments. Any updates to the autoencoder, the data library for new ADS experiences and, if there are any, updates to the operational margins of the global ADS model, are transmitted in step 212 to each of the vehicles in the fleet to update their local models (or to enable the local autoencoder to be locally retrained). In some embodiments the fleet server 12 will send the operational margin updates for the ADS model to each vehicle 1a,b,c in the fleet with the other transmitted 212 update data, but as these updates may be less frequent, in some embodiments such updates are sent independently of any autoencoder updates.

In some embodiments, the method comprises fleet server 12 transmitting data indicative of the updated scenario model and/or data library of new scenarios for retraining the autoencoder and/or the updated scenario trained autoencoder model algorithm to one or more or all, in other words, to each, of the plurality of vehicles 1. In this manner, the fleet comprising a plurality of vehicles 1a, 1b, 1c, is provided with an up-to-date scenario model and an up-to-date autoencoder model. By analysing the new scenarios/new experiences, the fleet server can assess how well the current ADS model is performing and, if appropriate, make changes to improve how any new experiences are safely handled going forwards. If, for example, one or more parameters associated with some component of the global ADS model were to be changed, then updates can be provided to the vehicles in the fleet. This could enable each ADS 10 on-board each vehicle 1 in the fleet to be re configured to better handle more and more "experiences" as these are encountered by the fleet of vehicles. The adaptation may for example manifest in inhibition of one or more ADS features, or adjustments of operational margins, for example: speed limits, distance to lead vehicles, overtaking manoeuvres, etc., etc. This type of adaptation may also be done in the vehicle in some embodiments. In some embodiments, the scenario model used by the ADS of each vehicle 1a, 1b, 1c, enables the ADS to adapt certain features, for example, highway pilot, traffic jam pilot, Adaptive Cruise Control, etc., etc., to operate differently in different geographical areas in order to reduce risk exposure to certain hazardous scenarios.

For example, if the updates indicates that there is an increased probability of some risk scenario, for example, perhaps there are many animal crossings, on a specific road segment, then one or more parameters or features of the ADS 10 may be reconfigured and/or adapted to, for example, reduce the maximum allowable speed of the ego vehicle for that road segment, or to inhibit fully-autonomous features completely for that road segment. In the latter case it is assumed that the ADS is not equipped to handle such a risk scenario wherefore a hand-over procedure may be initiated to the driver/occupant of the vehicle when approaching that road segment. The scenario identifier model may accordingly be utilized to determine if the conditions and/or requirements of the operational design domain are met, whereby the ADS validity may be determined.

Moreover, the utilization of scenario identification models provides for a harmonized and efficient means to use the same ADS framework both at design-time and at run-time, i.e. both for defining a ODD for the ADS as well as for asserting that the ADS is operating in an environment fulfilling the ODD. In some embodiments, a central operational design domain (ODD) model defines the operating domains for the fleet ADS system, relating to, but not limited to, geographic, roadway (e.g. type, surface, geometry, edges and markings), environmental parameters, connectivity, surrounding objects, traffic parameters, and speed limitations of the local ODD used by the ADS on-board each vehicle 1$a$, 1$b$, 1$c$ in the fleet. The use of scenarios accordingly may facilitate the overall development of autonomous features, the management of the ADS, as well as the verification process. Moreover, by using scenario models, a computationally efficient and bandwidth efficient means for sharing crucial information between ADS equipped vehicles and a central entity is provided. Stated differently, the utilization of scenario models which are used to defined the ODD for the ADS allows for more bandwidth-efficient overall system management as compared to sharing raw sensor data and processing the same.

In some embodiments, such as that shown in FIG. 3C, the ADS 10 of the vehicle accordingly uses the sensor data obtained in step 300 to identity behavioural scenarios (step 318 in FIG. 3A) and the scenario parameters which represent each identified behavioural scenario are input (step 320) into a scenario-trained autoencoder 16. The scenario trained autoencoder 16 then reconstructs the input scenario in step 334. The process of determining a reconstruction error using a scenario trained autoencoder is described later.

The disclosed object-level approach embodiments and embodiments which use a scenario-based approach, beneficially enable frequent updates to the fleet server's autoencoder and/or scenario identifier models to be provided and used for safety assurance, without sharing sensor data. By only providing information relating to new behaviours/scenarios, large amounts of bandwidth can be saved. Moreover, in some countries the data cannot otherwise be shared amongst various parties due to local regulatory legislation. The disclosed technology allows multiple parties to build a common and robust machine learning model for monitoring experiences encountered by an ADS fleet without having to share "data" as instead a federated ML system is used to identify anomalous behaviour. This can address regulatory and related issues such as data privacy, data security, and data access rights including the right to access to heterogeneous data.

In some embodiment where each vehicle 1$a$,1$b$, 1$c$ transmits to fleet sever 12 a locally updated set of scenario parameters for retraining the central or global autoencoder model. The scenario parameters may be transmitted in addition to or without the updated autoencoder model algorithm. If there are no strict bandwidth limitations or data restrictions, it may be advantageous to obtain raw data from the buffer rather than a set of extracted scenario parameters to allow more in-depth analysis of the raw data to be performed off-board, for example, by the fleet server 12, in a manner similar to that of methods 100$a$ and 100$b$.

In some embodiments, the update information received from vehicles 1$a$, 1$b$, 1$c$ in the fleet by the fleet server 12 in step 202 of FIG. 1 comprises additional experience data and/or an update to an autoencoder model algorithm which is stored in step 208 of FIG. 1 by the fleet server 12 until an event triggers a global update. At some point, if the update information received included local updates to an autoencoder model, then responsive to a triggering event such as, for example, a time-elapsed since the global autoencoder model 15 was last retrained, or the number of updates, or the volume of data received, any autoencoder model parameter updates received from each vehicle are incorporated in the central or global autoencoder model 15. If instead only experience data updates were provided in step 202, then from time to time these can used to retrain the global autoencoder model 15, and the triggering event for such retraining may comprise again, for example, a time-elapsed since the last update, or the number of updates received, or the volume of data received. The volume of data received may be also represented as a percentage or amount of storage being reached or over-reached with the last update which then triggers the global update to the autoencoder model. Once updated, the autoencoder model updates can be pushed out to each vehicle 1 in the fleet. By updating each on-board autoencoder model 16, an experience which was not part of the original library of experiences used to configure the local ADS can be prevented from being reported over and over again as a "new experience", when in fact it has already been reported to the fleet server 12.

The experience data library used to train the autoencoder does not need to always be a persistent replication of the latest data set used to configure each local ADS 16 or global ADS 17 in all embodiments as new experiences will be being encountered by each of the vehicles from time to time. The reported new experience updates are, in some embodiments, analysed by the fleet server 12 for at least one or more of the following purposes:
  a. to update ADS implementations, for example by adding new features/capabilities, according to the more refined ADS models and send these updates to the fleet;
  b. to change, for example, to increase or reduce, the operational margins of the ADS based on the updated autoencoder and/or scenario identification models.

Reducing the operational margins could result from an analysis meaning that an ADS does not need to be as cautious based on the new experience updates received. This could mean that the vehicle can proceed at a higher speed when encountering some experiences, but if, for example, the operational margins are increased in order to maintain safety, one or more parameters or features of the ADS can be adapted and/or configured so the vehicle is driven more cautiously when encountering some experiences.

Turning now to FIG. 5A, this illustrates schematically an embodiment of an anomalous behaviour detection system, ABDS, 11$a$ which is configured to receive a stream of buffered behavioural data 20A including sensor data comprising object-level data as well as road and other environmental data which the vehicle has sensed. The data is input, one buffer full at a time, into the encoding layer 24A of the autoencoder 16 of the ABDS 11a. In some embodiments, and as shown in FIG. 5A, each buffer full of data is processed or filtered using a filter 22 such as FIG. 5A shows to remove unwanted artefacts from the behavioural data, such as, for example, sensor data which represents objects which are too far away to be of interest.

In some embodiments of the ABDS 11a shown schematically in FIG. 5A, the behavioural data 20a which is input to the autoencoder 22 comprises sensed object-level, road and/or environmental data. For example, a 30 second time-segment of the data stream comprising data sensed by the perception system 3 of the vehicle 1. FIG. 5A shows schematically how filtered data input into the encoder layer 24a of the autoencoder is processed using the autoencoder's model algorithm. FIG. 5A does not show in any detail the architecture of the autoencoder model. However, a suitable autoencoder architecture in some embodiments includes a plurality of hidden layers each of which may be associated with one-or more latent variables according to the configuration of input parameters and the particular autoencoder algorithm being used.

The decoder 26a of the autoencoder 16 shown in FIG. 5A provides output which reconstructs each buffer or time-segment of data input, in other words the output of the decoder layer 26a is reconstructed input 28a. If the autoencoder 16 was not trained on data that included an example or sufficient examples of the input behavioural data from the buffer or time-segment, the output from the decoder 26a will be poorly reconstructed input 28a. The behavioural input from the buffer or time-segment can then be stored as an anomaly, i.e., as a new experience, 30a, so that it an be classified or otherwise identified and/or eventually reported to the fleet server 12 (shown as back end 12 in FIG. 5A) for further processing and classification.

Whilst other machine-learning based classifiers could be trained in a similar way to distinguish between two classifications of experiences such as known experiences and/or new experiences, where known experiences comprise, for example, experiences used to configure and/or develop the ADS model, an autoencoder model 16 is a type of machine learning model which exaggerates behavioural input that was not part of the data set used to train it in both FIGS. 5A and 5B. This means that by using an autoencoder 16 the ABDS 11 can be more sensitive to new experiences as it is more likely to find anomalous behaviour based on the size of the reconstruction error. As shown in FIG. 5A, the autoencoder 16 comprises encoder 24a and decoder 26a layers and a plurality of hidden layers (not shown in FIG. 5A) which are trained using suitable training data (see FIG. 2).

In some embodiments, the autoencoder 16 comprises a variational autoencoder having one or more hidden or bottleneck layers which have smaller dimensions than the original input and which are optimized during training to learn a compressed representation of the input data, but other examples of autoencoder models can be used as will be appreciated by anyone of ordinary skill in the art. An example of a paper exemplifying how an autoencoder used to detect data not included in its training dataset through the use of reconstruction errors in the context of the object-level data sensed by the perception system of an autonomous vehicle is known in the art is: "Improving Reconstruction Autoencoder Out-of-distribution detection with Mahalanbis Distance" by Denouden et al, arXiv: 1812.02765v1 6 Dec. 2018. This paper discusses and provides references for how autoencoders can be used to reconstruct the original input of objects sensed by the perception system of an autonomous vehicle as these are able to operate in an unsupervised mode while making few assumptions about the dataset provided as input. Thus, in some embodiments, an autoencoder may be used such as that described in this paper, which augments the metric for detection of the anomalies (the reconstruction error) with a second term which is the distance of the features in the latent space. In other words, in some embodiments of the disclosed technology, the autoencoder model may comprise an autoencoder which uses augmented cost functions. However nothing in this paper hints or discusses how an autoencoder could be configured on a vehicle and used continuously to detect new experiences as they are encountered by the vehicle in the manner disclosed herein so as to reduce the amount of data transferred to a remote fleet server 12 so it can monitor new experiences and/or scenarios for a fleet of vehicles as they are being driven around. A person of ordinary skill in the art will realise that there are many possible examples of an autoencoder which could be trained using object-level sensory data in the form used to configure and/or train an on-board ADS. Some other examples of autoencoder models, for example, autoencoders configured as convolutional neural networks, recurrent neural networks, long-short term memory neural networks, and/or stacked sparse AEs, which are suitable for being adapted to be trained based on features determined from sensory information comprising object-level training data, are provided in the following references: Liu, HaiLong, et al., "Visualization of driving behavior using deep sparse autoencoder", 2014 *IEEE Intelligent Vehicles Symposium Proceedings*, IEEE, 201: Sarna, Kyle, et al., "Driving feature extraction and behavior classification using an autoencoder to reproduce the velocity styles of experts", 2018 21st *International Conference on Intelligent Transportation Systems (ITSC)*, IEEE, 2018: Xie, Jie, Allaa R. Hilal, and Dana Kulić, "Driving maneuver classification: A comparison of feature extraction methods", *IEEE Sensors Journal* 18.12 (2017): pages 4777-4784.

Initially, the autoencoder 16 on board each vehicle is a copy of the global autoencoder 15 trained using a global experience data training set 17. The original global experience training data 17 comprises the same experience data library used to configure the global ADS 19. As the vehicle 1 is driven around the autoencoder 16 will exaggerate the reconstruction error of the anomalous behavioural data and the anomalies are then stored as new experiences in the data library of new experiences. The data library representing the new experiences is stored in a suitable form of local memory 7 and the stored new experiences may, in some examples, be used to locally retrain the local autoencoder and/or sent from time to time as experience updates to a remote server such as the fleet server 12 described hereinabove with reference to FIG. 1 of the drawings. In other words, the data library of experiences only includes the set of anomalous (as in new, or rare, or otherwise poorly modelled) experiences and does not include the experiences known, as in used to configure and/or to develop that vehicle's on-board ADS. The data library of anomalous experiences is the only thing that is needed to retrain the autoencoder (either retrain it in the vehicle or in the back office). However, the autoencoder is initially trained using the set of the known experiences to the ADS and such known experiences include all driving situations which are exposed to vehicles in the field test or data collection expeditions for ADS developments.

FIG. 5B shows an alternative embodiment where autoencoder 16 is trained instead using scenario level data to provide a scenario-trained autoencoder such as method 100c uses to detect previously unrecognised, i.e. new, behavioural scenarios.

FIG. 5B is a similar schematic which shows a scenario trained autoencoder 16 of ABDS 11b which is used to configure an ADS 10 on a vehicle 1. In FIG. 5B, the ABDS 11b includes an autoencoder 16 which has been trained using scenario data. The behavioural data input 20b comprises the behavioural data of scenarios identified by a scenario identifier of the ADS 10 (the scenario identifier is not shown in FIG. 5B). In this case, the if the anomaly input into the encoder 24b of the autoencoder 16 is poorly reconstructed by the decoder 26b of the autoencoder 16, it means that the scenario was incorrectly identified by the scenario identifier and that it was not previously included, or not sufficiently frequently included, in the recorded scenario training data 20b provided as input. If the reconstructed output 28b from the decoder layer 26b is above a threshold, for example, in some embodiments, then this indicates that the input data 20b contained an anomaly 30b, which may represent a new (as it was misidentified) scenario which can then be reported to a fleet server 12. In some embodiments, the fleet server 12 which receives the new scenario data may analyse this and in some embodiments the new scenario may be shared with the ADSs 10 of other vehicles 1.

The architecture of autoencoder 16 shown in FIG. 5B which is trained on the behavioural data representing the scenarios used to train the ADS may be any suitable type of autoencoder architecture known to anyone of ordinary skill in the art. The hidden or bottleneck layers of the autoencoder 16, the type of features which are input into the autoencoder, may all be determined in any suitable manner known to someone of ordinary skill in the art based on the type of sensed behavioural data of each scenario in some embodiments in the same manner as mentioned above referring to the autoencoder of FIG. 5A. In other words, in some embodiments, the difference between the input data 20a and 20b is that input data 20a comprises a bufferful of sensed object-level data which is then reconstructed by the autoencoder 16 whereas the input data 20b comprises sensed object-level data which represents a scenario (for example, a scenario output by the scenario identifier), in which case the reconstructed scenario will appear anomalous if the identified scenario includes object level data representing a new experience which has been encountered by the vehicle.

Turning to FIG. 6, this illustrates schematically how an a behavioural anomaly experienced by an ADS 10 on board a vehicle whilst it is being driven can detected using either a scenario trained autoencoder such as FIG. 5B shows or the buffer data trained autoencoder 16 of FIG. 5A. In FIG. 6, the autoencoder 16 is initially trained using training data 18 which initially configures the latent variables of the autoencoder model. As the vehicle is driven around an new experiences are encountered, a new experience data library 18 may be used to retrain the autoencoder 16.

If the input is a frequent behaviour and/or is a behaviour known to ADS, the initial training will ensure the autoencoder performs far better when reconstructing the input behaviour and this will accordingly be determinable as a small reconstruction error when the output of the autoencoder is compared with the input (as shown schematically in the lower part of FIG. 6). If the input was not included in the training data and/or was included very infrequently, the autoencoder 16 will output reconstructed behaviour which deviates with a large reconstruction error (see the top part of FIG. 6) when compared to the input behaviour. This large reconstruction error accordingly exaggerates the difference between the input behaviour and the known behaviour of the training data set, making it easier to recognise when new behaviour previously unrecognised (or not encountered) by the ADS has been experienced.

FIG. 7A shows schematically an example embodiment of a method of determining a reconstruction error using an autoencoder 16 which is used by the disclosed embodiments of method 100 such as methods 100a,b,c, which may use an autoencoder 16 appropriately trained on buffered data or scenario data as discussed above. For example, in some embodiments of method 100, the determining step 306 of the reconstruction error shown in FIGS. 3a,b,c comprises method 500 or 500a as shown in FIG. 7A or 7B.

Some embodiments of a method 500 of determining the reconstruction error as shown in FIG. 7 comprise the autoencoder 16 receiving behavioural data in step 502, reconstructing in step 504 the input behavioural data by first encoding the input data according to the autoencoder algorithm, processing it using the hidden layers to reduce its dimensionality, and then decoding the processed encoded data to reconstruct the input data, which is then output. The output behavioural data is then compared in step 508 with the input behavioural data to determine in step 510 a reconstruction error based on the differences between the input and output behavioural data. In some embodiments, of the method, such as that shown in FIG. 7B, the behaviour data for which a reconstruction error is determined comprises a path of the vehicle (see steps 506 and 508 of FIG. 7B and also FIGS. 8A and 8B).

In some embodiments of the method 500 or 500a, the determined reconstruction error is compared to an anomaly limit or cut-off maximum error value or other condition for being classified as an anomaly, for example, in step 512, where it is determined if the reconstruction error is below an anomaly limit in FIGS. 7A and 7B. If a condition for the input to be classified as indicative of an anomaly is met, for example, if a maximum reconstruction error is exceeded then this indicates an anomaly was present in the input which can then be identified in step 514 as, for example, a new experience or scenario. If the reconstruction error if low, then this indicates that the input 20a,b into the autoencoder 16 included sensed object-level behaviour which was included in the training data for the autoencoder 16 or included some anomalous behaviour which was not recognised by the autoencoder, for example, see step 516. The ABDS 11a, 11b can then output the data presenting the detected or identified anomaly and the ADS 10 is configured to store this data as an update in the on-board data library of new ADS experiences. In this manner, the output can accumulate until there is sufficient data for transferring the new experiences to the fleet server 12 or for retraining the autoencoder locally.

In addition, in some embodiments where the ADS 10 includes a scenario identifier module, then if the autoencoder is a buffer object-level trained autoencoder, the anomalous behaviour may be processed to extract behavioural parameters for updating the scenario identifier model used by the ADS and/or provided as a scenario update to the fleet server 12. In embodiments where the autoencoder is a scenario-trained autoencoder, a new scenario library can be used to retrain the autoencoder by providing behavioural data segments representing scenarios.

FIG. 7B shows an example embodiment of the method 500 shown in FIG. 7A where the reconstruction error for a particular behaviour comprising a vehicle path is determined. In FIG. 7, the method 500 comprises a method 500a in which the autoencoder 16 receives behavioural data in step 502 and the reconstructing behavioural data of step 504 enables path data of a sensed object to be reconstructed in step 506. This reconstructed path of the sensed object is then compared with the actual sensed path data (as included in the input data) in step 508. The reconstruction error between the original path and the reconstructed path is then determined in step 510. The other steps 510 to 514 in FIG. 7B are the same as those shown for FIG. 7A but in this case the reconstruction error is the error for the reconstructed path of the sensed object.

FIGS. 8A and 8B illustrate schematically a scenario or experience where a reconstruction error of certain behaviours indicates a new type of behaviour has been encountered by a vehicle, which may comprise vehicle 1a or 1b in the figures. The illustrated scenario in FIGS. 8A and 8B is merely one of several examples that could be used to explain the concepts disclosed herein as should not be considered limiting.

In FIGS. 8A and 8B, a number of ADS-equipped vehicles 1a, 1b, 1c experience a hazardous event which results in anomalous behaviours. In FIGS. 8A and 8B, the vehicle 1c brakes in front of vehicle 1b and as a result vehicle 1b pulls out or cuts-outs from the path of the vehicle 1a to avoid colliding with vehicle 1c. This exposes ego vehicle 1a with a braking scenario to avoid hitting vehicle 1b before it completely cuts out. In FIG. 8A, vehicle 1c brakes mildly while in FIG. 8B, it brakes harshly to avoid colliding with a crossing object in front. The situation in FIG. 8B represents a type of situation which occurs rarely on the road and if this type of situation has not been used to train the autoencoder 16, then the autoencoder 16 is not capable of reconstructing it with high accuracy and the reconstruction error for the tracked path of vehicle 1b as an object sensed by vehicle 1a will be large.

According to, ISO/PAS 21448 which relates to SOTIF, the Safety of the Intended Functionality, a hazardous event is a combination of a hazard (here a collision between vehicle 1a and vehicle 1b) and an operational situation (such as, for example, the situation depicted in FIG. 8B where an object 600 moves in front of vehicle 1c causing it to brake harshly). FIG. 8B accordingly shows a hazardous event which results in a large reconstruction error in the path of the vehicle 1b (and may also result in a large reconstruction error for vehicle 1a which may have braked harshly before running into vehicle 1b as it pulled out to overtake vehicle 1c as well as for vehicle 1c which may have braked harshly to avoid hitting object 600). The reconstruction error for each tracked object's or vehicle's path may be determined, for example, by using the maximum least squares difference of the actual path taken and that of the reconstructed path or any other suitable technique for determining a way of representing the maximum deviation between two curved paths when performing any of the embodiments of a method of reconstructing an error described hereinabove.

In the scenario shown in FIG. 8A, where there is no hazardous event 600 experienced by the vehicles, the on-board autoencoders of each of vehicles 1a, 1b and 1c will be able to reconstruct the input behaviours well below any threshold associated with a hazardous event. However, in the situation shown in FIG. 8B, where a hazard 600 has caused vehicle 1c to brake suddenly, and vehicle 1b to also brake so suddenly that vehicle 1a crashes into it before vehicle 1b completes the cut-out manoeuvre to swerve around the braking vehicle 1c and change lane, the on-board autoencoders of each of the vehicles 1a, 1b and 1c will generate large reconstruction errors assuming neither vehicle had encountered a similar experience previously.

In some embodiments, the anomalous behaviour determined using such reconstruction errors represent new or rare experiences and can be represented by sensed object-level data sets which be used to update a autoencoder training library of new experiences and to retrain the autoencoder model on board the vehicle. In some embodiments, the anomalous behaviour data or parameters representing that anomalous data is transmitted to the fleet server 12 and used to update a central autoencoder training library or a central autoencoder model of an ADS systems for a fleet of vehicles. The updated central autoencoder model can then be provided to other vehicles in the fleet. By sharing only new experience data with the experience monitoring fleet server 12, as more and more experiences become known to the fleet server 12, fewer new experiences will remain (at some point) to be transferred. This means that as the fleet server 12 monitors the fleet of vehicles 1a, 1b, 1c the amount of processing and communications resources consumed by the experience monitoring and management processes should reduce in the long term if the number of new experiences encountered by the fleet of vehicles 1a, 1b, 1c reduces in the long term.

In some embodiments, where the ADS includes a scenario identifier, a new scenario may be formed when anomalous behaviour is determined from the object-level data by the autoencoder. In such embodiments, the autoencoder can still be trained using object-level data but the new scenario may also be reported to the monitoring fleet server 12.

In some embodiments, as described above, the autoencoder is trained using scenario level data instead of object-level data. The anomalous behaviour is then determined by the autoencoder reconstructing a behaviour, such as the vehicles' path, using a reconstructed scenario. If the reconstruction error for the behaviour is high, the scenario will be considered an anomalous scenario. The autoencoder training library, or the on-board library of experiences, on the vehicle can then be updated with the anomalous scenario database and/or the autoencoder algorithm updated.

In some embodiments, the anomalous scenarios may be sent to the fleet server 12 which monitors and manages the new experience data and which also manages a central ADS system for the fleet of vehicles 1a, 1b, 1c. The fleet server 12 may also update a central data library of anomalous (as in new) experiences and/or a central autoencoder model of the central ADS system for the fleet of vehicles. The updated central autoencoder model can then be provided to other vehicles in the fleet.

By analysing the new scenarios/experiences encountered by one or more vehicles 1a, 1b, 1c, if a large number of new scenarios originate from an area related to an increased number of wild-life (e.g. deer, wild boar, bears, etc.) crossings at a particular road portion, the fleet server 12 may update one or more parameters such as the operational safety margins of the central or fleet server ADS model in some embodiments. For example, the amount of wild animals crossing a particularly busy road could be reflected in a large number of updates being received from the vehicles 1a, 1b, 1c encountering the wild animals along that stretch of road. If the number of updates reach a particular target or meet a particular condition, the wild-life cross behaviour can, in some embodiments, then be associated with that geographical area by the fleet server 12. This allows other ADS-equipped vehicles 1a, 1b, 1c to be instructed to, for example, implement a very cautious low speed driving mode and/or inhibit other behaviour (e.g. no horn honking) or not activation certain behaviour (e.g. not activating a traffic jam pilot) in that geographical area.

In some embodiments, as was shown in FIG. 6, when a vehicle experiences familiar behaviour, this will be associated with a frequently encountered scenario by the ADS of that vehicle. When the vehicle encounters unusual behaviour, a less frequent or rare scenario is encountered by the ADS. When the rare scenario data is processed by the autoencoder, the hidden or latent layers of the autoencoder are less likely to have been trained sufficiently to deal with the rare scenario. The result is that the autoencoder will generate larger reconstruction errors for rare scenarios than it will generate for the frequent scenarios. The rare scenario data can be used to at least i) update the autoencoder data library of anomalous experiences; and/or ii) retrain the autoencoder model on board the vehicle.

In some embodiments, data representing the anomalous behaviour determined using the autoencoder is transmitted by a vehicle to the fleet server 12. The fleet server 12 uses the received data to update a central autoencoder data library of anomalous experiences in some embodiments and/or a central autoencoder model of an ADS systems for a fleet of vehicles. The retrained central autoencoder model can then be provided to other vehicles in the fleet.

In this way, an up-to-date understanding of the environment of each vehicle 1 can be determined without sending the entire sensor data set or the entire scenario training data to the server 12 so the ADS systems can use a dynamically updated library of experiences.

In this way, although some experiences are rarely encountered by an individual vehicle, a fleet of vehicles are able to benefit from a frequently updated central ADS and central autoencoder model. This has various technical benefits. Firstly, it may improve the safety of each vehicle. Secondly, it does not require huge amounts of sensor data to be shared with the central server system, which saves bandwidth. It is furthermore particularly advantageous in countries where such data cannot be shared due to local legislations. In other words, it is possible to aggregate the required information in compliance with any data privacy acts. In other words, by means of the herein proposed methods and systems it is possible to enable multiple parties to build a common and robust machine learning model for monitoring experiences encountered by an ADS fleet without sharing "data", thus addressing critical issues such as data privacy, data security, data access rights and access to heterogeneous data. This may also be referred to as federated learning of the model used for safety assurance of the ADS.

Some embodiments of the disclosed methods are performed using a computer-readable storage medium which stores one or more programs configured to be executed by one or more processors of a processing system, the one or more programs comprising instructions for performing one or more disclosed methods, for example, the processor(s) 6 of the control system 5 of vehicle 1 in FIG. 2 (or vehicles 1a, 1b, 1c).

In some embodiments the fleet of vehicles associated with a fleet server includes only vehicles having an ADS 10 which includes a scenario identifier and which use an ABDS 11b including a scenario trained autoencoder 16.

In some embodiments the fleet of vehicles associated with a fleet server includes only vehicles having an ADS 10 which does not include a scenario identifier and which use an ABDS 11a including a buffered object-data trained autoencoder 16.

In some embodiments the fleet of vehicles associated with a fleet server includes only vehicles having an ADS 10 which includes a scenario identifier and which use an ABDS 11a including a buffered data trained autoencoder 16.

In some embodiments the fleet of vehicles associated with a fleet server include a plurality of vehicles each having an ADS 10 which includes a scenario identifier, some of which use an ABDS 11a including a buffered data trained autoencoder 16, and some of which use an ABDS 11b including a scenario data trained autoencoder 16.

In some of the above disclosed embodiments, a scenario identifier is associated with the autoencoder 16 of the vehicle so that when anomalous behaviour is detected either as a anomalous known scenario or as a new scenario from a buffer of data determined to represent new behaviour, the scenario identifier model is updated. The new scenario accordingly enables the ADS 10 of the vehicle 1 to recognise, if it is subsequently exposed to the same conditions, the new scenario.

In some embodiments, an anomalous scenario occurs is determined to have occurred around an ADS whenever the interaction of surrounding road users/objects together with environmental conditions has not yet been observed by that ADS or where the interaction of surrounding road users/objects together with environmental conditions has not yet been added to the scenario data used to configure that ADS (for example, this information has not yet been provided by the central server 12 of FIG. 1).

The disclosed embodiments allow a vehicle's on-board ADS to detect such anomalies and retain this data to improve the functioning of the on-board ADS, and also to share this information in a bandwidth efficient matter with other vehicles so that their on-board ADS can also benefit via the back-end (i.e. a central, or shared) server 12 in FIG. 1.

In one embodiment, the control system 5 of an ego-vehicle 1 performs a method 100 for monitoring experiences encountered by an Automated Driving System, ADS, 10 of a vehicle 1. The ADS 10 comprises an updateable autoencoder 16 configured to identify anomalous behaviour detectable by means of reconstruction errors between reconstructed behavioural data and the actual behavioural data sensed by the vehicle. The method may comprise: obtaining sensor data comprising information about a surrounding environment of the vehicle 1; determining behavioural data; inputting the determined behavioural data into the autoencoder 16; determining 306 a reconstruction error for the input behaviour data using the autoencoder 16; detecting anomalous behaviour in the surrounding environment of the vehicle based on the determined reconstruction error; extracting parameters representing the anomalous behaviour from the input behaviour; and updating a library of ADS behavioural data using the extracted parameters to include the detected anomalous behaviour.

In some embodiments, where the ADS 10 comprises a scenario identifier module configured to monitor scenarios in a surrounding environment of the ground-vehicle 1, the ADS may be further associated with a statistical model indicative of a statistical distribution related to a plurality of scenarios detectable by means of the scenario identifier module.

The above disclosed aspects and embodiments seek to mitigate or obviate all or at least some of the above discussed problems relating to managing the amount of ADS related data transfers required to update a fleet of vehicles with on-board ADSs with data representing new experiences encountered by one or more vehicles which are members of fleet.

Some of the disclosed aspects of methods and systems for monitoring experiences encountered by an Automated Driving System, ADS on-board a vehicle enable a fleet of such vehicles to provide new ADS experience updates in a timely and bandwidth efficient manner to a remote monitoring fleet server 12 which is configured to monitor and manage each vehicles on-board ADS. The fleet server 12 can then analyse the new experiences to determine if and how the new experiences could affect the models underpinning the development and safety analysis of the ADS, and determine if they do affect it to the extent that it would require updates to the ADS.

In some of the disclosed embodiments, each ADS 10 on-board a vehicle 1 in the fleet comprises a local copy of a global ADS model managed and monitored by a fleet server. Each ADS model 10 on a vehicle 1 was developed and/or configured using a database or library of experiences based on which the ADS is predicted to be able to safely operate in its target operational design domain. The ADS 10 is configured to show a safe behaviour in its ODD meaning that there is always a risk of failures but it is guaranteed that the residual risk is below an acceptable threshold. New experiences are detected using an autoencoder 16 which is trained using the same data forming the library of known experiences that the ADS was configured or developed with (which may, from time to time, be updated based on analysis of the new experiences). A new experience accordingly is an experience not previously considered in the safety analysis and development of the ADS. A known experience is an ADS experience which was taken into account when developing or configuring (or reconfiguring) the ADS. In other words, there is no benefit to any statistical models for an ADS if a known experience is reported as this will have already been taken into account by the ADS model. In this way, the impact of any new experiences on the safety model can be taken into account.

In some embodiments, the local and global autoencoder models 16, 15 output reconstructions of input data representing experiences it has been trained with in a well-behaved manner, i.e. with low reconstruction errors. Output by the autoencoder which has a high reconstruction error when compared with the input to the autoencoder implies the autoencoder was not trained to reconstruct that data. In other words, that segment of the data stream which was input and processed by the autoencoder included anomalous behavioural data.

As disclosed in the above embodiments, anomalous behavioural data is considered to represent a new, or, for example, a rare, experience which was either not present in the training data set which corresponds to the library of experiences used to configure or develop the ADS or which was not sufficiently captured previously. Each new experience which is detected using the autoencoder is stored locally in a data library of new ADS experiences and increases the set of states which that on-board ADS has encountered.

In some embodiments, the vehicle 1 instead or in addition sends the anomalous behavioural data representing a group of new experiences it has encountered to a fleet server 12. In some embodiments, it is also possible for the fleet server 12 to send just the anomalous data as an experience update to the new ADS experience libraries 18 on-board the vehicles 1a, 1b, 1c in the fleet. In some embodiments, responsive to analysing the impact of the new experiences to the safety analysis and the assumptions used for developing and verifying the ADS, the fleet server 12 may reconfigure the global ADS 19 and/or an operational margin or one or more other parameters of the ADS 19 may be adjusted and/or de-activated. By communicating such a change or changes to each fleet vehicle 1a, 1b, 1c, each vehicle can be provided with an updated local ADS 10 version of the global ADS 19.

In this manner, the disclosed methods and systems reduce the volume of data which a vehicle 1 would otherwise need to transfer to a new ADS experience monitoring and managing back or central office fleet server 12. Once transferred, the fleet server 12 may use the reported new experiences for a number of purposes, and, by updating the autoencoder system and communicating the autoencoder update to each vehicle in the fleet, reduce the likelihood of repeated transfers occurring for the same "new" experience. By sharing updated autoencoder model parameters and/or any changes made to the autoencoder model architecture responsive to the analysis of the new experiences, the volume of data shared by the fleet server with each vehicle is reduced, however, those of ordinary skill in the art will appreciate that as an alternative, the fleet server 12 could also share its global copy of the new experiences reported with each vehicle and then each vehicle could locally retrain its autoencoder to bring about a similar or equivalent update.

In embodiments where the fleet server 12 retrains the global autoencoder model 15 and then send updates to the local autoencoder model's algorithm directly to the vehicles 1a, 1b, 1c in the fleet, it means that each autoencoder model 16 may be better synchronised with each other in terms of what ADS states would be considered known for the purposes of preventing the same experience from being retransmitted several times from one or more of the vehicles 1a, 1b, 1c.

It should be understood that parts of the described solution may be implemented either in the vehicle, in a system located external the vehicle, or in a combination of internal and external the vehicle; for instance in a server in communication with the vehicle, a so-called cloud solution, as already exemplified. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims. For example, one or more or all of the disclosed methods may, in at least some if not all embodiments, be implemented as computer-implemented methods.

The invention claimed is:

1. A server for managing and monitoring Automated Driving System (ADS) experiences of the ADS of a fleet comprising a plurality of vehicles, wherein the server comprises a non-transitory memory storing computer executable instructions and at least one processor or processing circuitry configured to load and execute the computer executable instructions to cause the server to:
   receive anomalous experience update data from at least one of the plurality of vehicles, the update data comprising at least one anomalous experience update;
   store the anomalous experience update data for processing to update a global data library of anomalous ADS experiences and a global machine learning classification model algorithm; and
   transmit, if the global data library was updated, the stored data representing the updated global data library of anomalous ADS experiences and, if the global machine learning classification model algorithm was updated, an indication of the updated global machine learning classification model algorithm, to each of the plurality of vehicles forming the fleet,
   wherein the ADS is configured for an Operational Design Domain (ODD) and instructions executed by the processing circuitry cause the server to:
   perform a statistical count of experiences, distinct from experiences known to the ADS, associated with a particular geographical area within an operational environment of the ADS;
   compare the statistical count of experiences, distinct from experiences known to the ADS, against a predefined statistical count;
   determine if the statistical count indicates that one or more predefined requirements for the ODD are not fulfilled within the geographical area based on the comparison; and
   if so, inhibit activation of at least one feature or all of the features of the ADS within the geographical area.

2. The server of claim 1, wherein the global machine learning classification model algorithm comprises an autoencoder model, wherein the updated global autoencoder model is transmitted to the plurality of vehicles forming the fleet.

3. The server of claim 2, wherein the instructions executed by the processing circuitry cause the server to:
   receive information about a locally updated autoencoder model from one or more vehicles of the plurality of vehicles forming the fleet; and
   update the global autoencoder model based on the received information about the locally updated autoencoder model.

4. The server of claim 1, wherein the stored data representing the updated global data library of anomalous ADS experiences and/or the indication of the updated global machine learning classification model is/are transmitted responsive to receiving a request for update from each vehicle of the plurality of vehicles forming the fleet.

5. The server of claim 1, wherein the stored data representing the updated global data library of anomalous ADS experiences and/or the indication of the updated global machine learning classification model is/are transmitted responsive to a triggering event occurring.

6. The server of claim 1, wherein the instructions executed by the processing circuitry cause the server to:
   analyze the updated global data library of anomalous ADS experiences;
   responsive to the analysis indicating that the updated global data library of anomalous ADS experiences meets one or more conditions to update the operational margins of the ADS:
   transmit one or more operational margin updates of the ADS to each vehicle of the plurality of vehicles forming the fleet.

7. The server of claim 1, wherein the instructions executed by the processing circuitry cause the server to:
   analyze the updated global data library of anomalous ADS experiences; and
   transmit one or more ADS updates to each vehicle of the plurality of vehicles forming the fleet based on the analysis.

* * * * *